US012461696B2

(12) United States Patent
Enga

(10) Patent No.: US 12,461,696 B2
(45) Date of Patent: *Nov. 4, 2025

(54) ORGANIZING INFORMATION USING HIERARCHICAL DATA SPACES

(71) Applicant: Craxel, Inc., Chantilly, VA (US)

(72) Inventor: David Enga, Chantilly, VA (US)

(73) Assignee: Craxel, Inc., Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/920,309

(22) Filed: Oct. 18, 2024

(65) Prior Publication Data

US 2025/0044994 A1     Feb. 6, 2025

Related U.S. Application Data

(63) Continuation of application No. 18/535,518, filed on Dec. 11, 2023, now Pat. No. 12,147,714, which is a continuation of application No. 17/808,966, filed on Jun. 24, 2022, now Pat. No. 11,880,608.

(60) Provisional application No. 63/266,884, filed on Jan. 18, 2022.

(51) Int. Cl.
*G06F 16/22*     (2019.01)
*G06F 3/06*     (2006.01)

(52) U.S. Cl.
CPC ........ *G06F 3/0673* (2013.01); *G06F 16/2246* (2019.01)

(58) Field of Classification Search
CPC ............. G06F 16/1744; G06F 16/2246; G06F 16/278; G06F 16/282
See application file for complete search history.

(56) References Cited

U.S. PATENT DOCUMENTS

| | | | |
|---|---|---|---|
| 5,701,467 A | 12/1997 | Freeston | |
| 5,724,512 A | 3/1998 | Winterbottom | |
| 5,864,857 A | 1/1999 | Ohata et al. | |
| 6,223,182 B1 | 4/2001 | Agarwal et al. | |

(Continued)

FOREIGN PATENT DOCUMENTS

| WO | 0203237 A1 | 1/2002 |
|---|---|---|
| WO | 2014094047 A1 | 6/2014 |

OTHER PUBLICATIONS

Anjum et al. BangA: An efficient and flexible generalization-based algorithm for privacy preserving data publication. 2017. Computers, 6(1), 1. doi:http://dx.doi.org/10.3390/computers6010001. (Year: 2017).

(Continued)

*Primary Examiner* — James E Richardson
(74) *Attorney, Agent, or Firm* — CM Law PLLC; Scott C. Sample

(57) ABSTRACT

A method for storing or transmitting information may include determining at least one subdivision of at least one logical hierarchical data space. The at least one logical hierarchical data space may have a plurality of subdivisions. The method may further include creating at least one data block. The method may further include writing the at least one tuple to the at least one data block. The at least one tuple may be associated with the subdivision of the at least one logical hierarchical data space. The method may further include associating the at least one data block with the at least one subdivision of the at least one logical hierarchical data space.

33 Claims, 15 Drawing Sheets

(56) References Cited

U.S. PATENT DOCUMENTS

| | | | |
|---|---|---|---|
| 6,252,547 B1 | 6/2001 | Perry et al. | |
| 6,401,029 B1 | 6/2002 | Kubota et al. | |
| 6,542,819 B1 | 4/2003 | Kovacs et al. | |
| 6,636,802 B1 | 10/2003 | Nakano et al. | |
| 6,954,697 B1 | 10/2005 | Smith | |
| 7,382,244 B1 | 6/2008 | Donovan et al. | |
| 7,454,435 B2 | 11/2008 | Friedman et al. | |
| 7,720,436 B2 | 5/2010 | Hamynen et al. | |
| 8,176,269 B2* | 5/2012 | Jaquette | G06F 3/0689 707/674 |
| 9,098,470 B2* | 8/2015 | Calder | G06F 16/1787 |
| 2001/0045965 A1 | 11/2001 | Orbanes et al. | |
| 2002/0055924 A1 | 5/2002 | Liming | |
| 2002/0082748 A1* | 6/2002 | Enga | G01D 4/004 700/286 |
| 2002/0091696 A1 | 7/2002 | Craft et al. | |
| 2002/0115453 A1 | 8/2002 | Poulin et al. | |
| 2002/0160766 A1 | 10/2002 | Portman et al. | |
| 2002/0161627 A1 | 10/2002 | Gailey et al. | |
| 2002/0161647 A1 | 10/2002 | Gailey et al. | |
| 2002/0184200 A1 | 12/2002 | Ueda et al. | |
| 2003/0036848 A1 | 2/2003 | Sheha et al. | |
| 2003/0220835 A1 | 11/2003 | Barnes | |
| 2004/0019581 A1 | 1/2004 | Davis et al. | |
| 2004/0230467 A9 | 11/2004 | Gailey et al. | |
| 2005/0015307 A1 | 1/2005 | Simpson et al. | |
| 2005/0030194 A1 | 2/2005 | Cheng et al. | |
| 2006/0149774 A1 | 7/2006 | Egnor | |
| 2006/0206507 A1 | 9/2006 | Dahbour | |
| 2006/0265197 A1 | 11/2006 | Peterson | |
| 2007/0016565 A1 | 1/2007 | Evans et al. | |
| 2007/0041336 A1 | 2/2007 | Wan et al. | |
| 2007/0112808 A1 | 5/2007 | Howard et al. | |
| 2007/0234202 A1 | 10/2007 | Lyness | |
| 2007/0258623 A1 | 11/2007 | McGrath et al. | |
| 2008/0086464 A1 | 4/2008 | Enga et al. | |
| 2008/0126403 A1 | 5/2008 | Moon | |
| 2008/0183730 A1 | 7/2008 | Enga | |
| 2009/0150355 A1 | 6/2009 | Garfinkle et al. | |
| 2009/0164459 A1 | 6/2009 | Jennings et al. | |
| 2009/0192903 A1 | 7/2009 | Weiss et al. | |
| 2009/0307067 A1 | 12/2009 | Obermeyer | |
| 2010/0017261 A1 | 1/2010 | Evans et al. | |
| 2010/0042519 A1 | 2/2010 | Dingler et al. | |
| 2011/0016157 A1 | 1/2011 | Bear et al. | |
| 2012/0124289 A1 | 5/2012 | Kavuri et al. | |
| 2013/0042052 A1 | 2/2013 | Colgrove et al. | |
| 2014/0012959 A1 | 1/2014 | Round | |
| 2016/0321375 A1 | 11/2016 | Liu et al. | |
| 2017/0031828 A1* | 2/2017 | Dunlap | G06F 12/0877 |
| 2017/0068688 A1 | 3/2017 | Brodt et al. | |
| 2017/0169233 A1 | 6/2017 | Hsu et al. | |
| 2017/0250798 A1 | 8/2017 | Enga | |
| 2017/0308578 A1 | 10/2017 | Chen et al. | |
| 2018/0349422 A1 | 12/2018 | Tsuchida et al. | |
| 2020/0151268 A1 | 5/2020 | Johnson et al. | |
| 2021/0209088 A1 | 7/2021 | Zheng et al. | |

OTHER PUBLICATIONS

WO/ISR dated Sep. 22, 2022 in PCT/US22/73168.
International Search Report and Written Opinion dated Sep. 16, 2022 cited in PCT/US2022/073169, 9 pages.
International Search Report and Written Opinion dated Sep. 16, 2022 cited in PCT/US2022/073170, 9 pages.
International Search Report and Written Opinion dated Sep. 16, 2022 cited in PCT/US2022/073171, 8 pages.
Freeston The BANG file: a new kind of grid file. The BANG file: A new kind of grid file. 1987. In Proceedings of the 1987 ACM SIGMOD international conference on Management of data (SIGMOD '87). Association for Computing Machinery, New York, NY, USA, https://doi.org/10.1145/38713.38743 (Year: 1987).
Graybox "Storing Hierarchical Data in a Database." Sep. 10, 2014, retrieved by ISA/US in PCT/US2022/073169 on Aug. 14, 2022 (Aug. 14, 2022) from <www.graybox.co/knowledge/blog/storing-hierarchical-data-in-a-databases.
Liu et al. "Research and implementation of mass remote sensing image data storage and management." 2010 IEEE International Conference on Progress in Informatics and Computing. vol. 1. IEEE, 2010.Dec. 12, 2010 (Dec. 12, 2010) Retrieved on Aug. 13, 2022 from in PCT/US2022/073171.
Nadel. "Creating A Composite Index Using Ancestral Keys In A Hierarchical Database Table Design." Jun. 24, 2019, retrieved by the ISA/US in PCT/US2022/073170 on Aug. 12, 2022 from.
Nievergelt et al. The Grid File: An Adaptable, Symmetric Multikey File Structure. 1984. ACM Trans. Database Syst. 9, 1 (Mar. 1984), 38-71. https://doi.org/10.1145/348.318586 (Year: 1984).
Szalay, "Indexing the Sphere with the Hierarchical Triangular Mesh," Technical Report MSR-TR-2005-123, Microsoft Research, Redmond WA, Aug. 2005, 23 pages, cited by the examiner in U.S. Appl. No. 11/905,810.
Unpublished U.S. Appl. No. 17/808,961 entitled Transforming Relational Statements Into Hierachical Data Space Operations, filed Jun. 24, 2022 (Jun. 24, 2022) to David Enga (107).
Unpublished U.S. Appl. No. 17/808,968 entitled Composite Operations Using Multiple Hierarchical Data Spaces, filed Jun. 24, 2022 (Jun. 24, 2022) to David Enga (109).
Unpublished U.S. Appl. No. 17/808,973 entitled Executing Hierarchical Data Space Operations, filed Jun. 24, 2022 (Jun. 24, 2022) to David Enga (110).

* cited by examiner

100

| Column | Constraints | Data Type | First Logical Hierarchical Data Space | Second Logical Hierarchical Data Space |
|---|---|---|---|---|
| Name | PK | Varchar(64) | StringSpace 1 | StringSpace 2 |
| Birth Date | None | Datetime | DateTimeSpace 1 | DateTimeSpace 2 |
| Age | None | Integer | IntSpace 1(0,150) | IntSpace 2(0,150) |
| Salary | None | Numeric | NumericSpace 1 | NumericSpace 2 |
| Location | Unique | Geospatial | GeospatialSpace 1 | GeospatialSpace 2 |

| Physical Hierarchical Data Space | Key | First Logical Hierarchical Data Space | Second Logical Hierarchical Data Space |
|---|---|---|---|
| A | Name | StringSpace 1 | StringSpace 2 |
| B | Location | GeospatialSpace 1 | GeospatialSpace 2 |

FIG. 1B

334
| A | B |
|---|---|
| α {0-11} | 1 {0-00} |
| β {0-00-10-01} | 1 {0-00} |
| β {0-00-10-01} | 2 {0-01-00} |
336
| A | B |
|---|---|
| α {0-11} | 3 {0-01-11-00} |
| β {0-00-10-01} | 4 {0-01-11-01} |
FIG. 3C
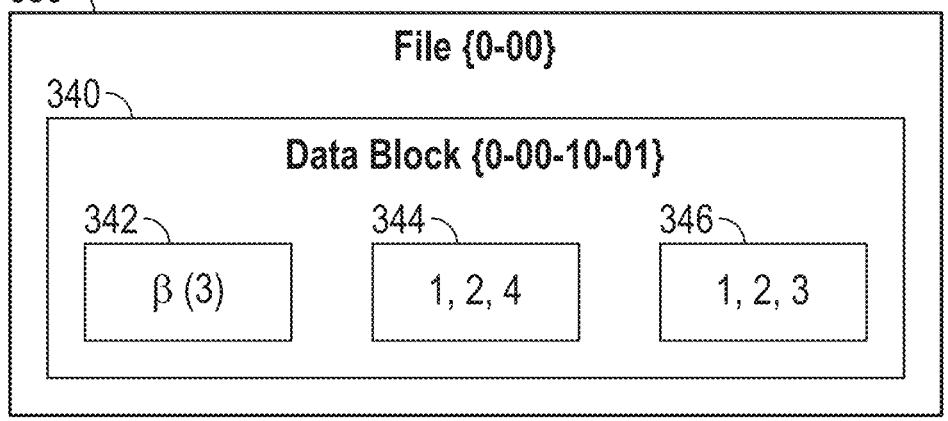
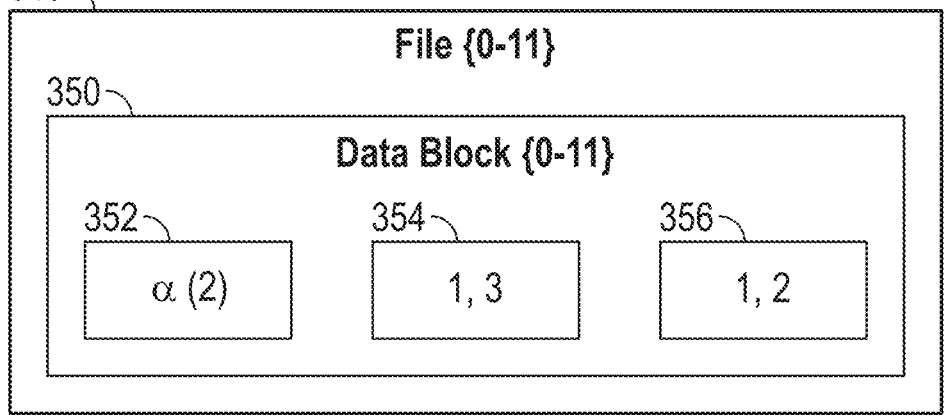
FIG. 3D

ORGANIZING INFORMATION USING
HIERARCHICAL DATA SPACES

PRIORITY

This application is a continuation of U.S. application Ser. No. 18/535,518, now U.S. U.S. Pat. No. 12,147,714, which is a continuation of U.S. application Ser. No. 17/808,966 filed on Jun. 24, 2022, now U.S. Pat. No. 11,880,608, which claims the benefit of U.S. Provisional Patent Application No. 63/266,884, filed on Jan. 18, 2022, the contents of all of which are incorporated fully herein by reference.

BACKGROUND OF THE INVENTION

Field of the Disclosure

The present disclosure relates to information security, and more particularly to a system for transmitting or storing information using hierarchical data spaces.

BACKGROUND

Relational data management systems were designed and implemented to operate in the relational data model using either row or columnar approaches for organizing relations by the value of specified attributes, also known as columns. These systems organize and retrieve information by comparing or sorting values. Column-oriented approaches store the values of each column separately. When these columns are unsorted, the system must scan the entire column of values to perform an operation. Relational and non-relational data management systems perform data operations by value for the attributes relevant to the operation.

SUMMARY OF THE INVENTION

Accordingly, embodiments of the invention are directed to a system and method for transmitting or storing information using one or more hierarchical data spaces that substantially obviates one or more of the problems due to limitations and disadvantages of the related art.

In one aspect, a system for at least one of transmitting or storing information includes a memory that stores instructions, and a processor that executes the instructions to perform operations. The operations may include determining at least one subdivision of at least one logical hierarchical data space. The at least one logical hierarchical data space may have a plurality of subdivisions. The operations may further include creating at least one data block. The operations may further include writing at least one tuple to the at least one data block. The at least one tuple may be associated with the at least one subdivision of the at least one logical hierarchical data space. The operations may further include associating the at least one data block with the at least one subdivision of the at least one logical hierarchical data space.

In another aspect, a method for at least one of transmitting or storing information may include determining at least one subdivision of at least one logical hierarchical data space. The at least one logical hierarchical data space may have a plurality of subdivisions. The method may further include creating at least one data block. The method may further include writing the at least one tuple to the at least one data block. The at least one tuple may be associated with the at least one subdivision of the at least one logical hierarchical data space. The method may further include associating the at least one data block with the at least one subdivision of the at least one logical hierarchical data space.

In still another aspect, a computer readable device, which when loaded and executed by a processor, causes the processor to perform operations for at least one of transmitting or storing information may include determining at least one subdivision of at least one logical hierarchical data space. The at least one logical hierarchical data space may have a plurality of subdivisions. The operations may further include creating at least one data block. The operations may further include writing at least one tuple to the at least one data block. The at least one tuple may be associated to the at least one subdivision of the at least one logical hierarchical data space. The operations may further include associating the at least one data block with the at least one subdivision of the at least one logical hierarchical data space.

BRIEF DESCRIPTION OF THE DRAWINGS

The accompanying drawing, which is included to provide a further understanding of embodiments of the invention and are incorporated in and constitute a part of this specification, illustrate embodiments of the invention and together with the description serve to explain the principles of embodiments of the invention.

FIG. 1A shows a schema with multiple, different logical hierarchical data spaces associated with the columns of a relation according to various embodiments;

FIG. 1B shows the physical hierarchical data spaces for a relation and multiple, different logical hierarchical data spaces associated with each of those physical hierarchical data spaces according to various embodiments;

FIG. 3C shows two relations with values and hierarchical path identifiers for two columns according to various embodiments;

FIG. 3D shows tuples stored in multiple files, data blocks, and sub data blocks corresponding to the subdivisions of a hierarchical data space according to various embodiments;

DETAILED DESCRIPTION OF THE PREFERRED EMBODIMENTS

Figure 1C:
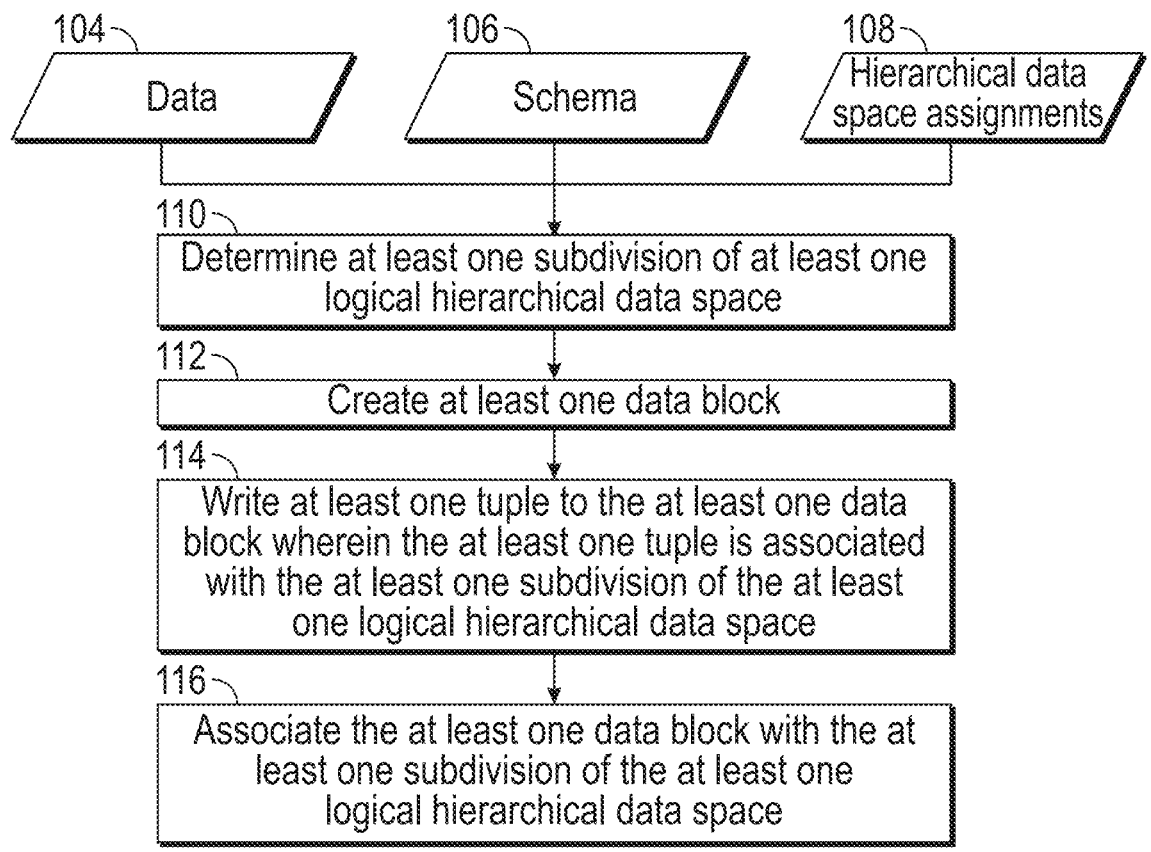
FIG. 1C shows a method for organizing information in one or more data blocks by writing tuples associated with a subdivision of a logical hierarchical data space in a data block and associating the data block with the same subdivision according to various embodiments.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete and will fully convey the concept of the invention to those skilled in the art.

Data, data value, or value is any sequence of one or more symbols. A data value or value may have an associated data type. A tuple is a sequence of one or more data values. A tuple may be an ordered sequence of one or more data values. A tuple may be an unordered sequence of one or more data values. A tuple is also a data value. As such, tuples may contain other tuples. Various methods of organizing the data values in a tuple are contemplated including, but not limited to, a sequence of one or more data values, ordered sequences of data values, unordered sequences of data values, individual key values, key/value pairs, records, elements, a data structure, a collection such as a list or map, structures, unions, self-describing records, an XML document or element, a JSON key/value pair, or a JSON list. A relation, or table, is a set of tuples where the value of each attribute, or column, of the tuple is a member of a data domain. Data values are vulnerable when they are not encrypted or when they are encrypted and co-located with the encryption keys that can decrypt them.

A file is a collection of data stored on a computer storage device. The computer storage device may be volatile or non-volatile. There are various computer storage devices including, but not limited to, random access memory (RAM), read-only memory (ROM), magnetic storage devices, flash memory devices, optical storage devices, cloud storage services, virtual storage. A file is typically accessible to a computer program executing on a computing device as a one-dimensional array of contiguous bytes. Although bytes are typically used, different data types may be used, such as a one-dimensional array of contiguous 32-bit or 64-bit words.

The one-dimensional array of contiguous bytes may be stored in a computer storage device as non-contiguous bytes. The computer storage device, file system, operating system, or other software may translate the non-contiguous bytes in storage so that a computer program executing on a computing device may access it as a one-dimensional array of contiguous bytes. A file may have an associated identifier so that the collection of data can be found in the computer storage device using the identifier. This identifier may be a pointer to a memory location of the computer storage device or a name that the computer storage device, file system, operating system, or other software uses to find the underlying bytes. The identifier may also include a path. A file may have associated metadata. There are many ways to organize information by file identifier and path.

A data block is a contiguous subset of bytes in a file or a message. A data block may be fixed or variable length. Since a file may be stored or a message transmitted as non-contiguous bytes, a data block may also be stored or transmitted as non-contiguous bytes and translated to appear as contiguous bytes. For example, a file system may store a file in a set of non-contiguous fixed sized blocks and then translate the contents so that the data in the file can be accessed by its position in a contiguous set of bytes. In another example, a message may be split into a set of packets in the underlying communications network, but the sender provides the data for the message as a contiguous set of bytes and the receiver translates the message back into a contiguous set of bytes.

A logical hierarchical data space (LHDS) is a space that is divided into a plurality of subdivisions. Each subdivision is recursively subdivided into child subdivisions and so on until a maximum depth is reached. A parent subdivision is any subdivision that is part of another subdivision's path to the root subdivision. A subdivision is a child of another subdivision if that other subdivision is a parent subdivision. A child subdivision is an immediate child subdivision of a parent subdivision if the parent subdivision has depth that is one less than the child subdivision. Together, immediate child subdivisions must fill all the space of their parent subdivision. Immediate child subdivisions of a subdivision may not overlap each other. Child subdivisions may not extend beyond their parent subdivision's space. These properties are required. A common subdivision of two or more subdivisions is a subdivision that is a parent of each. There may be multiple common subdivisions for two or more subdivisions. There must be at least one common subdivision for any two or more subdivisions because all subdivisions are children of the root subdivision. A deepest common subdivision is the deepest common subdivision of two or more subdivisions. If one of the subdivisions is a parent of the other subdivision, then it will be the deepest common subdivision. If neither Two or more subdivisions will always have exactly one deepest common subdivision. It may be the root subdivision.

Data values are projected onto the LHDS so that the path through the subdivisions holding the value can be identified. This path is called a hierarchical path identifier (HPId). an HPId identifies a path to a subdivision in a hierarchical data space. an HPId explicitly specifies the depth of the subdivision being identified or implicitly specifies the depth based on the length of the path specified by the hierarchical path identifier. The projection of a data value must be consistent so that the same data value always projects to the same subdivision at the same depth. The projection of a data value does not depend on previous data values projected onto the space or stored in the space. The boundaries of each subdivision are fixed. Because a hierarchical data space preserves the hierarchy of its subdivisions, an HPId identifies a subdivision and any parent subdivisions to the root of the data space. Hierarchical path identifiers and data values may be encrypted in ways that minimize the information an intruder can learn about the data being stored. Hierarchical path identifiers, even when encrypted, must preserve the hierarchy of its subdivisions for operations using the hierarchical data space to function properly.

A hierarchical data space block is a data block that is associated with at least one subdivision of at least one logical hierarchical data space. A hierarchical data space block may be associated with subdivisions from multiple logical hierarchical data spaces. A hierarchical data space block may include child data blocks. It may also include data or metadata.

A logical hierarchical data space is described by a hierarchical data space definition. In one embodiment, the hierarchical data space definition comprises the function and parameters that map a data value for a specific data type to a subdivision of a hierarchical data space. There are many different mapping functions, combinations of functions, and parameters that may be used. The parameters of the hierarchical data space definition modify how the function maps a data value to the subdivisions of the hierarchical data space. For example, the domain of 32-bit integers is −2,147,483,648 to 2,147,483,648, but the range of integer values expected in a column such as the Age column in schema 100 may be 0 to 125. Mapping the smaller range to the entire space may make queries against the hierarchical data space more selective. Once generated, hierarchical path identifiers may be used independently in hierarchical data spaces without the data value and the hierarchical data space definition used to generate them. This allows the execution of probabilistic operations using hierarchical data spaces on untrusted computers without exposing sensitive data values or the hierarchical data space definition used to project data values into the hierarchical data space.

A hierarchical path identifier can be used to find the subdivision in the hierarchical data space as well as the path through a hierarchical data structure representing the hierarchical data space. As used herein, a "physical hierarchical data space" refers to an instantiation of a structure that maintains the hierarchical relationship between the subdivisions of one or more logical hierarchical data spaces.

By preserving hierarchy, hierarchical data spaces can efficiently support probabilistic bounding, range, multi-dimensional, intersection, prefix, exact match queries, and other operations using hierarchical path identifiers without comparing any values. Hierarchical data spaces support range query by preserving hierarchy instead of preserving order. Hierarchical data spaces have no inherent notion of order. This may reduce inference data security risk.

An encrypted hierarchical path identifier is an HPId that has been encrypted by applying secret permutations to each subdivision's set of immediate child subdivisions. This reduces the probability that an attacker without the secret key can determine the original subdivision of space each portion of the hierarchical path points to. For those data types with a notion of order, these secret permutations can eliminate ordering. This may also reduce inference risk. The hierarchy of the subdivisions must be preserved throughout the encryption process so that encrypted probabilistic operations can still function properly.

Encrypted hierarchical path identifiers allow operations to be split between initial probabilistic execution using encrypted hierarchical path identifiers performed on untrusted computers and execution by value performed on trusted computers. The amount of data to be decrypted and the amount of execution by value is related to how effective the probabilistic execution is on the untrusted computers.

The attributes of each tuple may also be associated with one or more different logical hierarchical data spaces. An operation that wishes to act on a specific attribute of the tuple can probabilistically evaluate the hierarchical path identifiers for that attribute prior to or without evaluating the value of the attribute itself. This probabilistic evaluation using different logical hierarchical data spaces is essentially an intersection or AND operation on the results of evaluating an operation against a tuple in each hierarchical data space. If the operation's HPId for a given hierarchical data space does not match the tuple's HPId for that hierarchical data space, then the tuple does not match. If the hierarchical path identifiers do match, then the tuple may be a match for the operation. In this context, match does not necessarily mean that the hierarchical path identifiers identify the exact same subdivision. For many operations, they may match if one HPId identifies a parent subdivision of the subdivision identified by the other HPId or vice versa.

To use hierarchical data spaces to store or transmit information, logical data spaces need to be chosen or specified for a given operation. The operations may also need information about the data being stored.

A relational schema defines the structure of a table and a set of constraints and data types defined for the columns in the table. FIG. 1A shows a schema 100 that has five named columns. They are Name, BirthDate, Age, Salary, and Location. Name is from the domain of variable length characters (varchar). BirthDate is from the domain of datetime. Age is from the domain of integers. Salary is from the domain of real numbers (numeric). Location is from the geospatial domain.

Schema 100 also shows a schema for a table and the assignment of two logical hierarchical data spaces to each column. More than one LHDS definition may be associated with each column. Using multiple different LHDS definitions can improve the selectivity of a query or operation that uses hierarchical path identifiers to find probabilistic matches. Tuples that have a valid HPId for an operation's HPId for the same hierarchical data space are a candidate match. The probability they are a match increases with each additional hierarchical data space where the operation matches the candidate. If the candidate value's HPId is not valid for the operation's corresponding hierarchical path identifier, then the probability it is a match is zero. The hierarchical data spaces must have different subdivisions, or the use of multiple hierarchical data spaces will not increase the selectivity. Ensuring each hierarchical data space has different subdivisions may be accomplished by specifying different parameters or by using different hierarchical space definitions that inherently subdivide space differently.

Schema 100 defines the columns for a table. It specifies the column name, constraints, data type, and logical data spaces for each column. In at least one embodiment, three different logical hierarchical data spaces are associated with each column. Although schema 100 describes attributes for a relation, schema 100 could also have described the attributes found in other non-relational forms such as a JSON document. In addition to associating logical hierarchical data spaces to a column or attribute, other useful information can be specified in the schema.

The data type attribute specifies the domain for the column and optionally the length or the range of the data. The constraint column allows various constraints to be set for a given column. For example, a primary key constraint indicates that the column is part of the primary key for the default physical hierarchical data space.

FIG. 1B shows the assigned physical hierarchical data spaces for the relation defined by schema 100. The data for the relation can be stored in physical hierarchical data spaces using hierarchical path identifiers instead of in data structures that order records by value. A first LHDS and a second LHDS are specified for each physical hierarchical data space. Although a first and a second hierarchical logical data space are shown, additional different logical hierarchical data spaces can be used. They are described as a first and second to denote that the logical hierarchical data spaces are different, in that they use a different method of subdividing space, have different parameters that change how they subdivide space, or use a different function to map a data value to subdivision. The attributes of a schema comprising the physical hierarchical data spaces, columns, and logical hierarchical data spaces can be used to determine how to store the tuples in a hierarchical data space.

FIG. 1B could also describe the physical hierarchical data spaces for non-relational data such as JSON, image or video metadata, or XML and the attributes to use for extracting the values to generate hierarchical path identifiers.

Storing or transmitting information organized using hierarchical data spaces allows the data to be operated upon probabilistically using hierarchical data space operations instead of by value. This enables the values to be encrypted external to the storage or transmission of data. If stored data or transmitted data is organized by value, it may be exposed. Using hierarchical data spaces for storing data provides constant time O(1) access for any specified subdivision of a logical hierarchical data space. The use of multiple logical hierarchical data spaces may resolve collisions in subdivisions with lots of data. By storing or transmitting data using hierarchical data spaces, the data remains sorted by subdivision. This allows efficient operations over multiple data sets organized using the same logical hierarchical data spaces. Data in the same subdivision is more likely to be similar, providing an opportunity for improved storage and network compression ratios. There are multiple ways to store or transmit information using hierarchical data spaces, each with different advantages and limitations.

One approach for storing information using hierarchical data spaces is in one or more files wherein each file stores data corresponding to at least one subdivision of at least one logical hierarchical data space. This means that a file contains data corresponding to one or more subdivisions and their children. For increased selectivity, each file may correspond to at least one subdivision for each of at least two or more different logical hierarchical data spaces. This provides a way to determine if a file may contain information relevant to a hierarchical data space operation.

Many files may be used to store very large quantities of information. Organizing files in a way so that they hold data corresponding to subdivisions deeper in an LHDS may provide more selective filtering of the files relevant to a given operation. As a file is created, the subdivision of the at least one logical hierarchical data space for each tuple being written to the file can be recorded so that one or more common subdivisions for the entire file can be determined. That common subdivision may then be associated with the file. Multiple files could hold data associated with the same subdivisions of the at least one logical hierarchical data space.

One way to organize data inside the files using hierarchical data spaces is to append the at least one tuple and at least one hierarchical path identifier to a file. In this case, either a new file or an existing file can be used. An advantage of this approach to writing at least one tuple in a file is the ability to rapidly write tuples to the file while avoiding random input/output operations. A limitation is that tuples corresponding to the same subdivision are unlikely to be stored together inside the at least one file unless only tuples associated with the same subdivision are stored in the file. Given an LHDS may be comprised of billions of subdivisions, this approach may lead to a very large number of files. Determining the applicable files to access for a given operation could itself take substantial computing resources.

To perform an operation using this approach, all the tuples and their corresponding hierarchical path identifiers in the applicable files will be scanned. Any tuples with matching hierarchical path identifiers may then be retrieved. Instead of operating on tuples by value, the tuples may be operated upon probabilistically using hierarchical data spaces to determine if they match. Since the HPId preserves the hierarchy of the subdivisions of the hierarchical data space, operations such as range, bounding, joins, and intersection query can be performed probabilistically. This approach would have performance of O(N) where N is the total number of tuples stored in all the files. Once all the tuples have been written to the file, the deepest common subdivision for all tuples in each hierarchical data space can be determined and associated with the at least one file. This allows an operation to determine if the file is relevant to the operation. Since tuples are essentially randomly distributed using append-only writing, the common parent subdivision may not be selective, and many files may be relevant to an operation. Data updates and deletions may require special processing when executing operations.

Another way to store information in one or more files using hierarchical data spaces wherein the file stores data corresponding to at least one subdivision of at least one logical hierarchical data space is to append the at least one tuple to a first file and append the location of the at least one tuple in the first file and at least one HPId to a second file. This is like the previous approach except the at least one tuple and at least one hierarchical path identifiers are stored in separate files. An advantage of this approach is also append-only writing of the tuples and hierarchical path identifiers. A limitation is that tuples corresponding to the same subdivision are unlikely to be stored together inside the at least one file unless only tuples associated with the same at least one subdivision of the at least one LHDS are stored in the file. Given an LHDS may be comprised of billions of subdivisions, this approach may lead to a very large number of files. Determining the applicable files to access for a given operation would itself take substantial computing resources.

To perform an operation, all the associated hierarchical path identifiers can be scanned by accessing the at least one second file. The location stored with any matching hierarchical path identifiers can then be used to retrieve the corresponding tuple from the set of first files. Instead of operating on tuples by value, they can be operated upon first probabilistically using hierarchical data spaces. Since the HPId preserve the hierarchy of the subdivisions of the hierarchical data space, operations such as range, bounding, joins, and intersection query can be performed probabilistically. If the size of hierarchical path identifiers is smaller than the size of the tuples, then this approach may be more efficient than using a single set of files, though still O(N) where N is the total number of tuples in the set of first files. Two sets of files would need to be maintained when data is added with this approach. If both sets of files are stored on the same disk, then random input/output will be high. Data updates and deletions may require special processing when executing operations. Once tuples have been written to the file, one or more common subdivisions for all tuples in each hierarchical data space can be determined and associated with the at least one file. This association allows an operation to determine if the file is relevant to the operation. Since tuples are essentially randomly distributed using append-only writing, the deepest common subdivision may not be selective, and many files may be found relevant to an operation.

The previous approaches describe how to store information in one or more files so that which file is relevant to a given operation can be determined using hierarchical data spaces. These approaches have a variety of limitations because the files are not internally organized using hierarchical data spaces. The data is simply appended. Unless each file is limited to just one subdivision, the tuples corresponding to the same subdivision are not stored together.

The preferred embodiment for storing data is to organize each file into one or more data blocks, wherein each data block corresponds to at least one subdivision of at least one logical hierarchical data space. These data blocks are called hierarchical data space data blocks. This allows tuples associated to the same subdivision of one or more logical hierarchical data spaces to be stored together. Tuples relevant to an operation can be found rapidly, not only because the relevant files can be quickly identified, but also become the data blocks relevant to the hierarchical data space operation can be rapidly found. Tuples associated with the same subdivision of an LHDS are also likely to have similar data values, so storing them together provides an opportunity for better compression ratios. The tuples in a data block be compressed. Specific values for an attribute in each tuple may be compressed. The entire data block may be compressed. The tuples in a data block may also be encrypted. Specific values for an attribute in each tuple may be encrypted. The entire data block may be encrypted.

An effective way to transmit data is also to organize each message into one or more data blocks, wherein each data block corresponds to at least one subdivision of at least one logical hierarchical data space. This allows data to be transmitted in a way that maintains the hierarchy of the logical hierarchical data spaces, so that receiving parties can efficiently operate on the received data as the data remains sorted and accessible by subdivision. For some operations, the receiving party will not have to deserialize every tuple in the transmission because they can choose which subdivisions to operate upon. The data corresponding to a subdivision is more likely to be similar, providing an opportunity for better compression ratios. The tuples in a data block be compressed. Specific values for an attribute in each tuple may be compressed. The entire data block may be compressed. The tuples in a data block may also be encrypted. Specific values for an attribute in each tuple may be encrypted. The entire data block may be encrypted.

FIG. 1C shows a method of storing or transmitting data by organizing data in data blocks using hierarchical data spaces. Data 104 represents incoming data. This data could be received from another computer or device. It could also be created on the same computer or device. The data could be in a variety of formats. In some cases, the data may be structured using some format that is not self-describing. A schema such as schema 106 may be used to describe the attributes present in data 104. Schema 106 corresponds to the schema in FIG. 1A. Hierarchical data space assignments 108 may specify the logical hierarchical data spaces for each attribute, set of attributes, or the associated physical hierarchical data spaces like those described in FIG. 1B. Data 104, schema 106, and hierarchical data assignments 108 are optional inputs included to describe an embodiment.

The use of one or more logical hierarchical data spaces is contemplated. Each additional different LHDS improves collisions handling. Tuples that map to a subdivision in a first LHDS may not map to the same subdivision of a second different logical hierarchical data space. The preferred number of different logical hierarchical data spaces is three. Various ways of determining the at least one LHDS are contemplated including, but not limited to, specified in an operation, specified in a parameter, specified in the input data, specified in the schema for the table being operated upon, specified in hierarchical data space assignments for the table being operated upon, derived from the input data, hard coded, read from a property file, looked up in a map based on a value in the input data, extracted from a statement, selected from a set of hierarchical data spaces based on the attributed present in a statement or operation, selected using information in a schema based on a value or values extracted from a statement or operation, or selected by choosing a physical hierarchical data space and using its associated logical hierarchical data spaces.

For example, FIG. 1B shows two physical data spaces. Physical hierarchical data space A uses the "Name" field as its key attribute. This allows for information to be found efficiently by "Name" as the value for the "Name" attribute will be mapped to a subdivision of at least one LHDS used by physical hierarchical data space A. Physical hierarchical data space B uses the "Location" attribute as its key attribute. This allows for information to be found efficiently by "Location". Physical hierarchical data space A and physical hierarchical data space B both have two logical hierarchical data spaces. The logical hierarchical data spaces used will depend on which physical hierarchical data space the data will be stored in. For example, if the data contains a tuple for the relation specified by schema 100, then the hierarchical data space assignments 108 can be used to select the logical data spaces for physical hierarchical data space A and physical hierarchical data space B.

Figure 10:
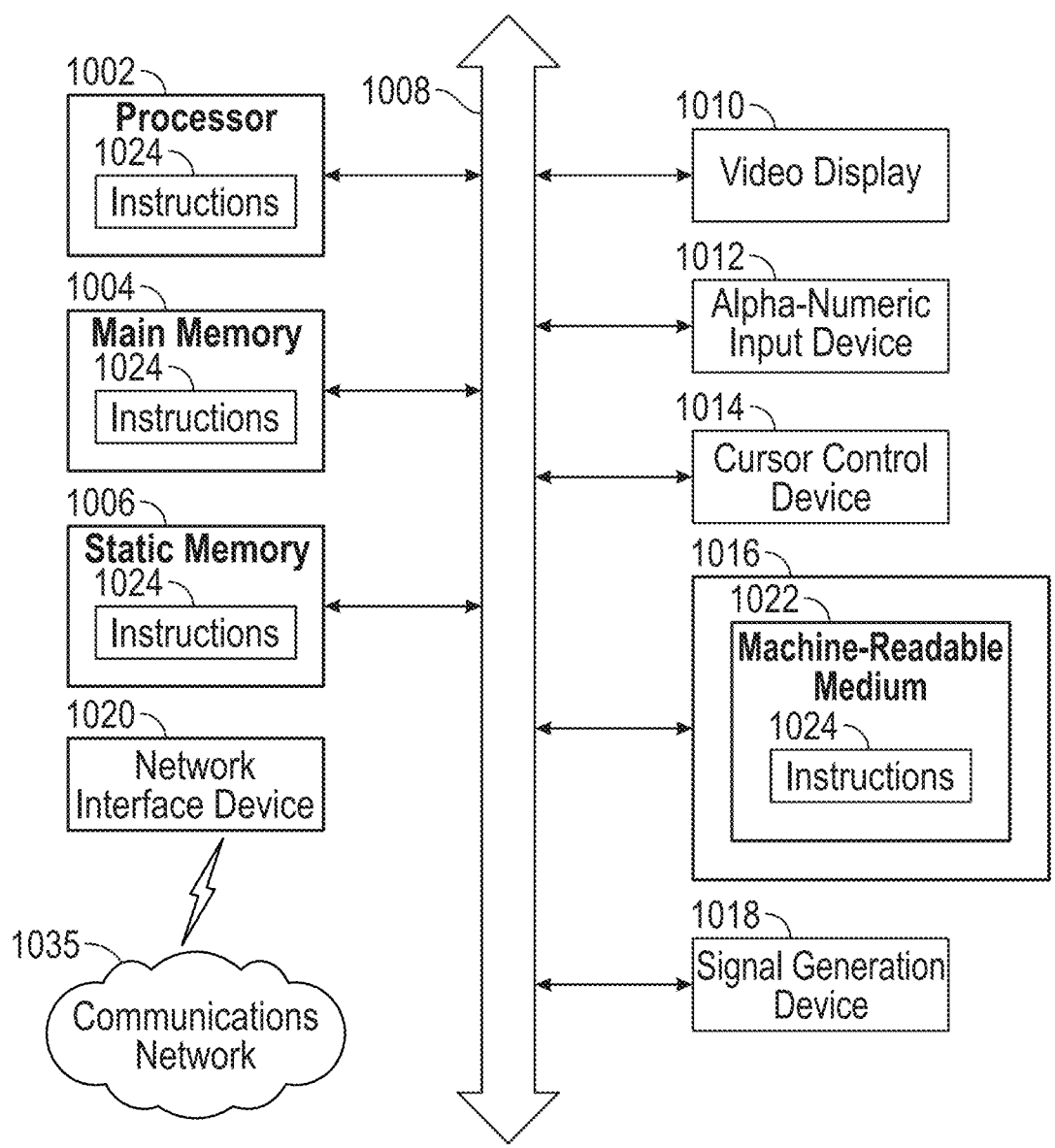
FIG. 10 is a schematic diagram of a machine in the form of a computer system within which a set of instructions, when executed, may cause the machine to perform any one or more of the methodologies or operations of the systems and methods for organizing information using hierarchical data spaces.

Step 110 determines at least one subdivision of the at least one logical hierarchical data space. At least one subdivision is determined for each logical hierarchical data space, e.g., by a processor (e.g., processor 1002; FIG. 10). For example, if two different logical hierarchical data spaces are used, then at least one subdivision for each of the different logical hierarchical data spaces will be determined. Various methods of determining at least one subdivision of the at least one LHDS are contemplated, but not limited to, receiving the at least one subdivision from the at least one operation, determining at least one value and identifying at least one subdivision of the at least one LHDS that corresponds to the at least one value, using an HPId to identify the at least one subdivision, using an encrypted HPId that preserves the hierarchy of the at least one LHDS to identify the at least one subdivision, retrieving a value from an input data set and generating an HPId that identifies the at least one subdivision, extracting a value from a result set and generating an HPId that identifies the at least one subdivision, or retrieving an HPId from a result set and using it to identify the at least one subdivision.

The same process that is used for generating a hierarchical path identifier may be used for determining the at least one subdivision of the at least one LHDS from the value for a given attribute. First, at least one attribute that corresponds to the at least one LHDS is chosen. Next, at least one value for the at least one attribute is determined. Finally, at least one subdivision of the at least one LHDS is identified that corresponds to the at least one value.

For instance, an attribute specified as the key attribute for the physical hierarchical data space can be chosen. Multiple attributes can be specified as the key for a physical hierarchical data space. FIG. 1B shows that the "Name" attribute is the key attribute for physical hierarchical data space A and "Location" is the key attribute for physical hierarchical data space B. The at least one LHDS is one of the logical hierarchical data spaces associated with the physical hierarchical data space.

Next, at least one value for the chosen at least one attribute is determined. Methods of determining at least one value for the at least one attribute include, but are not limited to, extracting the at least one value from the input of a data operation, extracting the value from a statement, extracting the at least one value from a tuple, extracting the at least one value from a record in a result set, extracting the at least one value from an ordered sequence of data values, or extracting the at least one value from an unordered sequence of data values using the attribute as a lookup key. For the first or second LHDS for physical hierarchical data space A, the value for the "Name" attribute would be the input value. For the first or second LHDS for physical hierarchical data space B, the value for the "Location" attribute is extracted. Finally, at least one subdivision of the at least one LHDS is identified that corresponds to the at least one value. The subdivision that is identified may be specified using a hierarchical path identifier. During this process, the identity of the subdivision may be encrypted using secret permutations that preserve the hierarchy of the logical hierarchical data space.

Step 112 creates at least one data block. Various methods of creating data blocks are contemplated including, but not limited to, allocating a region of memory, allocating a region of a file, starting a data block at the current position in a file, writing a delimiter to a file, writing a header to a file or a message, pre-calculating the size of the data block and allocating memory, pre-calculating the size and position of all the data blocks in a file or message, or initially allocating space and then reallocating if the space becomes insufficient, which may be performed by a processor (e.g., processor 1002; FIG. 10).

Step 114 will write at least one tuple to at least one data block wherein the at least one tuple is associated with at least one the subdivision of the at least one logical hierarchical data space, which may be performed by a processor (e.g., processor 1002; FIG. 10). Hierarchical path identifiers may be stored as an element of the tuple or separately. The tuple may already be in a serialized form and may be written directly to the data block. The tuple may require serialization. There are no known restrictions on the data format used to serialize the tuples to the data block.

The preferred embodiment is to write tuples associated with the same subdivision of an LHDS to the same data block. In this embodiment a file or message may be comprised of multiple data blocks and each data block may be associated with at least one subdivision of at least one logical hierarchical data space. When multiple logical hierarchical data spaces are used, each data block may be associated with at least one subdivision of each LHDS used. That allows operations to determine which data blocks are relevant based on the operations associated subdivisions. The tuples may be sorted to provide improved compression ratios. A data block that is associated or corresponds with a subdivision of an LHDS may also hold tuples that are associated with child subdivisions of that subdivision. This allows tuples associated with child subdivisions to be aggregated under a parent subdivision to avoid the overhead of a dedicated data block for that child subdivision. For example, it may not be worth the overhead to have a data block store only a single tuple when it could be stored in a data block for the tuple's associated subdivision's parent.

Organizing the data blocks of a file or message in a way that maintains the hierarchical relationship of the subdivisions of the at least LHDS supports efficient access patterns.

Various embodiments for organizing data blocks in a way that maintains the hierarchical relationship of the subdivisions of the logical hierarchical data spaces in the data blocks are contemplated including, but not limited to explicitly maintaining the hierarchy by nesting data blocks within parent data blocks with corresponding subdivisions, explicitly maintaining the hierarchy by including pointers to child data blocks in each data block, or implicitly maintaining the hierarchy using an association between each data block and their corresponding subdivisions of each logical hierarchical data space.

A parent data block contains data blocks that correspond to child subdivisions of the parent data block's corresponding subdivision.

An alternate embodiment for organizing data blocks in a way that maintains the hierarchical relationship of the subdivisions of the logical hierarchical data spaces in the data blocks is to include in the data block the location of its child data blocks. Each time a tuple is added, changed, or deleted; the tuples for the data block and location of its child nodes are written to the data block. If a data block is too small to hold the updated contents, then the tuples and location of its child nodes will be written to a new data block. If the location of the data block corresponding to the subdivision changes, the data blocks corresponding to the parent subdivision may also need to be written with the new location of the data block. A write for a single subdivision may cause writes to the data blocks for other subdivisions. To reduce this likelihood, each data block may be allocated with free space. To update the contents of a subdivision by writing its contents and child pointers to a data block with free space, one random input/output operation may be all that is required.

To perform an operation with a corresponding subdivision, the operation will start by reading the root data block, read the location of its children, and then access the necessary child data blocks. This may be repeated until all the relevant data blocks are accessed, and the operation performed. The only way to access a data block is to start at the root. This may require many random input/output operations as each data block may be located anywhere in the computing storage device or message.

The preferred embodiment for organizing data blocks in a way that maintains the hierarchical relationship of the subdivisions of the logical hierarchical data spaces in the data blocks is to nest data blocks within other data blocks with corresponding subdivisions and through associations between data blocks and their corresponding subdivisions of the logical hierarchical data spaces. This allows data blocks corresponding to an operation's subdivision to be found using the association or by traversing the data blocks. This supports random access to any data block for which an association is maintained. Operations can then access applicable child data blocks by traversing the data block's child data blocks located within the data block. Without associations, every data block would only be accessible by traversing the nested data blocks starting at a root data block in a file or message. It is possible for there to be an extremely large number of subdivisions in a hierarchical data space and an extremely large number of corresponding data blocks. It may not be desirable to maintain an association between each data block and subdivision. The preferred embodiment allows that to be managed by limiting which associations are kept. All associations do not have to be kept because child data blocks may be accessed within their parent data block. The preferred embodiment also allows flattening the data blocks if desired for some applications so that some child data blocks are not kept in their parent data blocks. The reason this is possible is that those child data blocks could be accessed if an association does exist with their corresponding subdivision.

Some data blocks may not contain many tuples. The preferred embodiment allows these tuples to be stored in a parent data block instead, thereby enabling a way to reduce the total number of data blocks.

The preferred embodiment also allows efficient access to the data blocks of different files or messages that correspond to the same subdivision of an LHDS because they can be found by accessing the associations between the data blocks and subdivisions. This also provides more efficient use of immutable files, where files are only written once and read many times. Mutations are written to new files and resolved when operations execute.

Various embodiments for serializing tuples to a data block are contemplated, including but not limited to writing the tuple as an ordered sequence of values, an unordered sequence of values, as serialized structured data, as an array of values, as a map of attribute/value, or lists of values. In at least one embodiment, the tuple can be shredded by attribute so that the values for each attribute from multiple tuples are stored together in a subblock of the data block. These subblocks may be efficiently compressed because the data types are the same or the values for the same attribute in multiple tuples are likely to be similar. Grouping tuples by the subdivisions for at least one LHDS corresponding to a common attribute increases the likelihood that the values for the same attribute for those tuples will have similar values, facilitating improved compression ratios. Sorting the tuples by one or more attribute further increases the likelihood that successive values for the same attribute are the same or similar.

In at least one embodiment, the tuple is simply a reference to data 104 and data 104 is written to the data block. Various other formats for writing the tuples to the data block are contemplated, but not limited to, using JSON, CSV, BSON, YAML, ASN. 1, Protobuf, XML, AVRO, or as raw binary.

Step 116 associates the at least one data block with the at least one subdivision of the at least one logical hierarchical data space. Various methods of associating a data block with the at least one subdivision of the at least one LHDS are contemplated including, but not limited to, storing an HPId with the data block, storing an HPId with the data blocks metadata, storing an HPId in a lookup table, storing an HPId in a physical hierarchical data space, registering the association with a registrar, associating the location of the data block with the subdivision of the at least one LHDS, storing the association in a data structure in a message, or using a reference to the location of the data block to associate the data block with the subdivision of the at least one LHDS, using nested references to the data block, or storing the association in a data structure in a file, which may be performed by a processor (e.g., processor 1002; FIG. 10).

The file or message containing the data block may also be associated with the subdivision of the at least one logical hierarchical data space. It may also be recorded that the file or message contains a data block associated with a given subdivision of the at least one logical hierarchical data space. Metadata may be accumulated for the subdivision of the at least one logical hierarchical data space. This metadata may include the HPId for the subdivision. It may include the hierarchical path identifiers for any child subdivisions of the subdivision. The metadata may include statistics for the subdivision as well as aggregated statistics for the child subdivisions of the subdivision. Statistics may include, but are not limited to, the size of the tuples, the age of the tuples, average size of the tuples, median size of the tuples, average time of the tuples in the buffer, longest time of a tuple in the buffer, whether the tuples have been sorted, whether the tuples have been encrypted, whether the tuples have been compressed, the compressed size of the tuples, and compression ratio of the tuples. The metadata accumulated may be stored in the file, message, or a data block. The metadata accumulated may also be stored by a registrar. Statistics for each data block of the file may be aggregated and stored in a file or message or stored in a registrar along with the registration for the file. The metadata may also include, but is not limited to, the location of the data block in the file or message, the size of the data block, the format of the data block, the location of any subblocks or pages, a timestamp, a time interval for the data contained in the data block, range of values for an attribute stored in the data block, deepest common subdivisions for one or more attributes stored in the data block, bloom filters for one or more attributes stored in the data block, or the compression used to compress the contents of the data block.

Figure 1D:
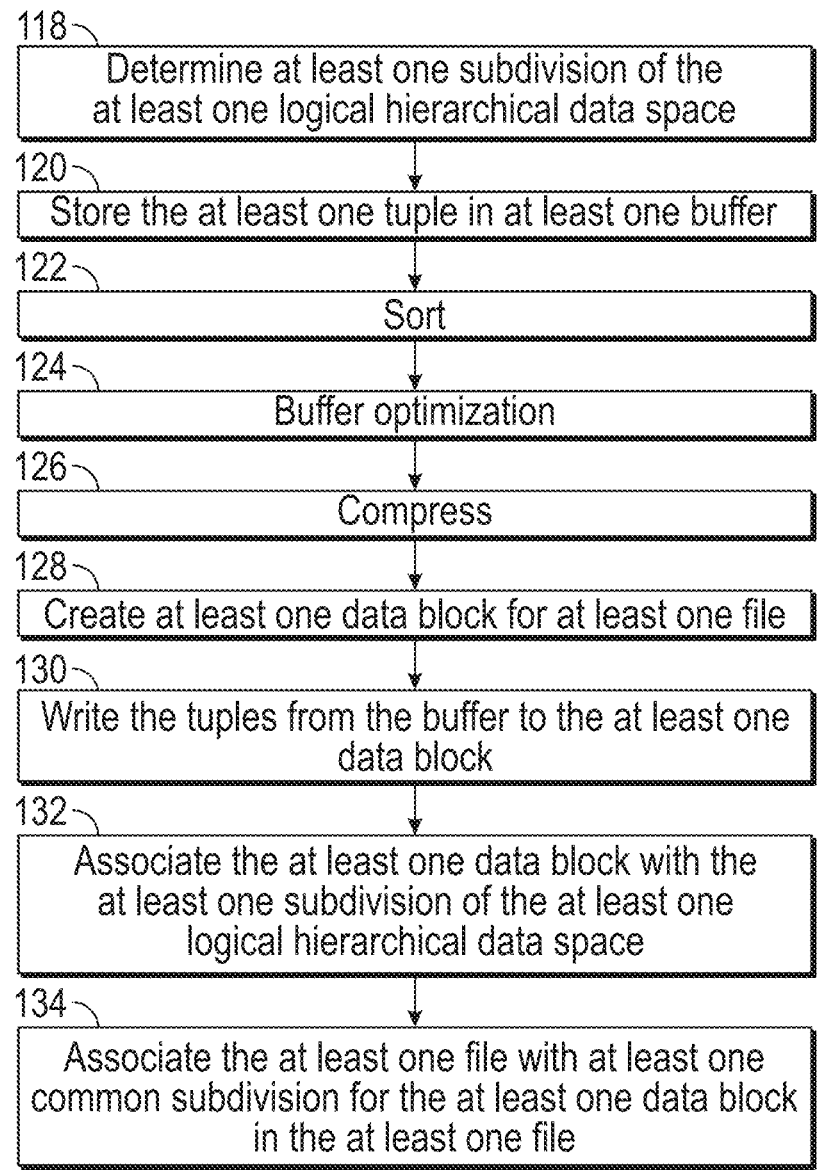
FIG. 1D shows a method of storing at least one tuple in a data block using a buffer according to various embodiments.

FIG. 1D shows a method for storing tuples in buffers so that tuples corresponding to the same subdivision for at least one LHDS can be gathered for writing to a data block of a file or a message. The steps in FIG. 1D may be performed by a processor (e.g., processor 1002; FIG. 10). Step 118 will determine at least one subdivision of the at least one logical hierarchical data space. Step 120 will store the at least one tuple in at least one buffer corresponding to the subdivision for the at least one logical hierarchical data space. By buffering multiple tuples associated with the same subdivision of the at least one logical hierarchical data space, they can be written together in the same data block. They can also be sorted, optimized, and compressed before being written. In at least one embodiment, the buffer will use a physical hierarchical data space that holds the buffers for the subdivisions of the at least one logical hierarchical data space. Other data structures could be used such as a hash map to associate the buffer with a subdivision of the logical hierarchical data space. Data structures that cannot preserve the hierarchy of the logical hierarchical data spaces may be less efficient.

The tuples may be sorted in step 122 by one or more attributes. Tuples correspond with the same subdivision in one LHDS may correspond with different subdivisions in another logical hierarchical data space. Step 122 may sort the tuples by their corresponding subdivisions in their logical hierarchical data spaces. Sorting may be performed as tuples are stored in the at least one buffer or may occur right before or as part of the process of storing the tuples in data block. If the values for the attributes of the tuple are available to the component writing the data blocks, the tuples may also be sorted by the value of those attributes. If the values are encrypted, then they may not be sorted by value. Sorting may also be performed as part of the buffer optimization process 124.

Step 124 may optimize the size and layout of the data blocks by optimizing how the tuples are buffered in subdivisions of the logical hierarchical data spaces. Given the overhead of a data block, storing a data block with just a single tuple may be inefficient. The optimization method can place tuples in parent subdivisions until enough tuples are present in the parent subdivision. Once enough tuples are present, the parent subdivision can be split into child subdivisions. Each tuple in the parent subdivision can then be repositioned among the parent subdivision and its children. Each tuple with a subdivision that is the same as the parent subdivision or the same as one of the child subdivisions would be placed in a buffer corresponding to that subdivision. For the other tuples, they would be placed in a buffer corresponding to the child subdivision that is a parent subdivision of their subdivision. If there are no tuples or just a few to move into the child subdivisions, it may not be efficient to perform a split. Buffer optimization may take this into account when making splitting decisions. The buffer optimization method may optimize based on various parameters including, but not limited to, a minimum number of tuples in a buffer for a subdivision, the number of tuples for each child subdivision, an aggregate number of tuples for a child subdivision and all its child subdivisions, the number of tuples in the same subdivision for all files, or a target subdivision depth for a relation.

Buffer optimization may also split subdivisions using multiple different logical hierarchical data space. The tuples for a given subdivision may correspond to the same subdivision of a logical hierarchical data space. This is known as a collision. However, these tuples may not correspond to the same subdivision of a different logical hierarchical data space. The use of different logical hierarchical data spaces allows for tuples that collide in one LHDS to be effectively organized using additional different logical hierarchical data spaces. Buffer optimization may determine that it is beneficial to create new buffers in the different LHDS and move tuples from the initial subdivision to new buffers corresponding to subdivisions in the different logical hierarchical data space. Buffer optimization may use parameters to determine when the contents of a buffer should be moved into new buffers in a different LHDS including, but not limited to the density of the tuples if they were placed in new buffers, a maximum number of tuples for a subdivision, a minimum number of tuples for the new buffers, whether other files with the same subdivision have split the subdivision, or the depth of the subdivision. FIG. 5B illustrates a method for placing a tuple in a subdivision corresponding to a different logical hierarchical data space.

The tuples for the at least one buffer can be compressed in step 126. Various compression techniques are contemplated including, but not limited to, dictionary encoding, run-length encoding, entropy encoding, Huffman coding, or special purpose compression algorithms. Compression may be performed during the process of storing the tuples or performed on an ongoing basis as tuples are added to the buffer. Since tuples corresponding to the same subdivisions of an LHDS likely have similar values to other tuples with the same subdivision, computer processors may be able to compress the tuples more efficiently. Tuples corresponding to the same subdivisions for multiple logical hierarchical data spaces are even more likely to have similar values. Therefore, sorting the tuples by their subdivisions and by the values of different attributes can lead to better compression ratios.

Figure 8:
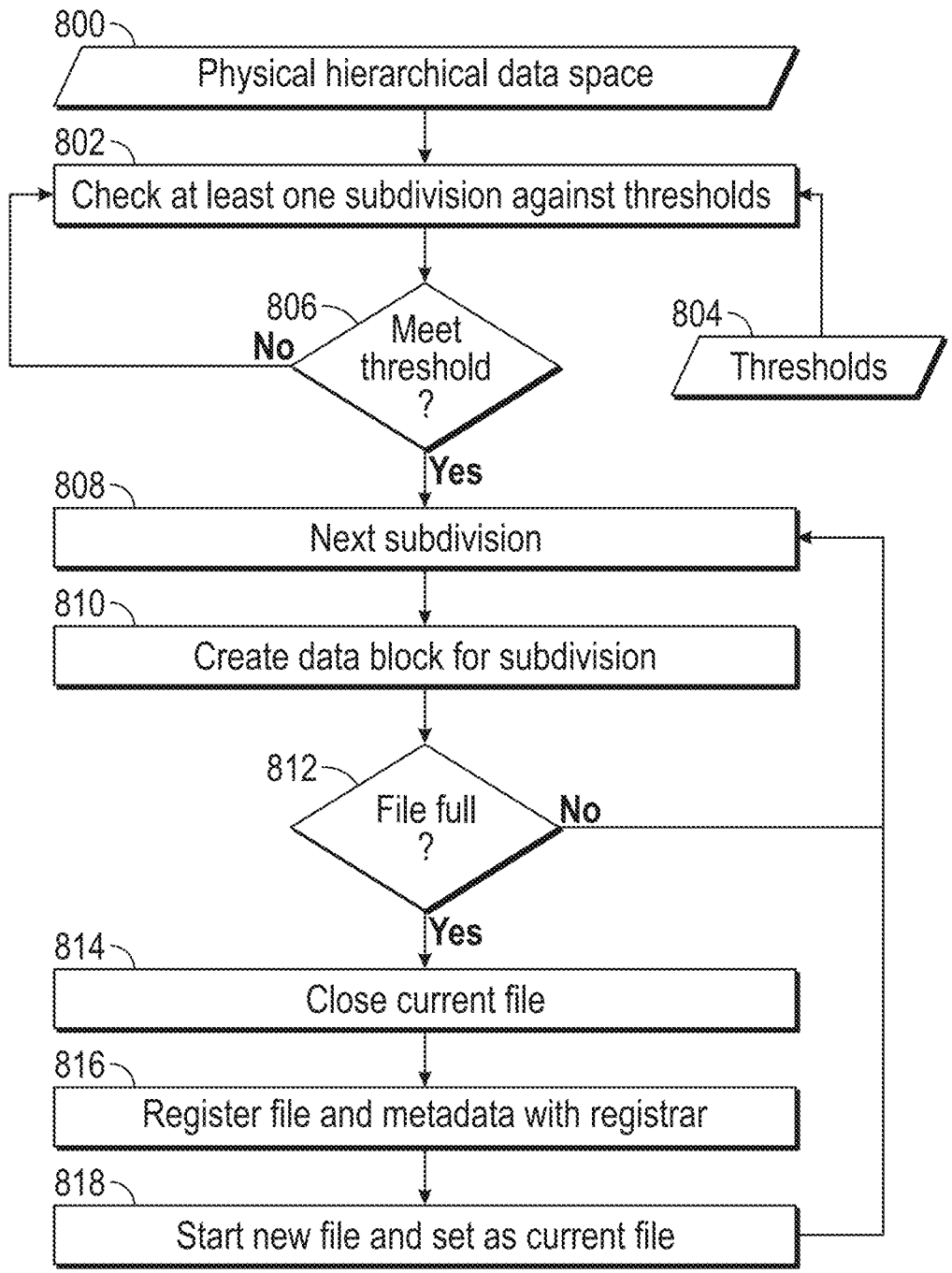
FIG. 8 shows a method for writing the tuples buffered in a physical hierarchical data space to one or more files according to various embodiments.

Step 128 will create at least one data block for at least one file or message. The tuples buffered together for the at least one subdivision will be written in step 130 to the data block of the at least one file or message. Determining when to write the buffer to a data block may be based on various thresholds or parameters. FIG. 8 shows one method for determining when to store the tuples that are buffered into a file or message.

In step 132, the data block will be associated with the at least one subdivision of the at least one logical hierarchical data space. If there are more than one LHDS chosen, the data block will be associated with the at least one subdivision for each of the at least one logical hierarchical data space. Tuples associated with the same subdivision of the at least one LHDS are stored together in the same data block. Queries or other operations that are looking for tuples for a given subdivision can find the corresponding data blocks and read the tuples in those data blocks. By organizing the tuples stored in a file corresponding to the subdivisions of a hierarchical data space, the amount of input/output to access the tuples can be minimized. By associating the data block and metadata about the data block with its corresponding subdivision of the at least one logical hierarchical data space, data blocks and statistics relevant to an operation can be found and accessed using constant time O(1) operations.

Multiple different logical hierarchical data spaces can be used to improve the selectivity of a query or other operation against a given data block. For instance, the data block can be associated with hierarchical path identifiers for multiple different hierarchical data spaces. An operation that contains hierarchical path identifiers corresponding to the same hierarchical data spaces as the ones associated with the data block can determine if the data block corresponds to subdivisions relevant to the operation in all those hierarchical data spaces. If a corresponding subdivision is not relevant in even just one hierarchical data space, then the data block is not relevant to the operation.

Step 134 will associate the at least one file or at least one message with at least one common subdivision for each LHDS for the data blocks in the at least one file. This allows operations to quickly determine if a file or message may have data blocks that correspond to the subdivisions specified in the operation. If the file or message has a common subdivision matching the subdivisions for the operation, then the subdivisions associated with each data block can be used to determine which data blocks an operation must access.

Various ways of determining at least one common subdivision are contemplated, including, but not limited to finding the deepest common subdivision for each LHDS for all data blocks in the at least one file or at least one message, finding the deepest common subdivision for each LHDS for the tuples stored in the at least one file or at least one message, or determining the N deepest common subdivisions for each LHDS for all data blocks in the at least one file or at least one message, or determining the N deepest common subdivisions for each LHDS for all tuples stored in the at least one file or at least one message.

A root subdivision is always common to every subdivision in a logical hierarchical data space. However, it is not very selective for an operation looking for data blocks or files corresponding to a subdivision if the file is associated with the root subdivision. Files or messages may contain data blocks that correspond to subdivisions that have a common subdivision towards the root of the logical hierarchical data space. Therefore, it may be more selective for an operation if more than one common subdivision is determined for a file or message.

The at least one file or at least one message corresponds the deepest common subdivision for each LHDS for all data blocks in the at least one file or at least one message. This means it may only contain tuples in its corresponding subdivision or its children. By associating the file or message with the deepest common subdivision of all the subdivisions associated with the data blocks in the at least one file or at least one message, files or messages relevant to an operation can be rapidly found and accessed. If the corresponding subdivision for a file or message does not match the subdivisions for the HPId for the operation, then the file or message does not contain any tuples that could match the operation. Multiple different logical hierarchical data spaces can be used throughout this process to improve the selectivity of the operations. For instance, a file could be associated with subdivisions for multiple different hierarchical data spaces. An operation that contains hierarchical path identifiers corresponding to the same hierarchical data spaces as the ones associated with the file can determine if the file is relevant to the operation in all that hierarchical data spaces. If it is not relevant in even just one hierarchical data space, then the file is not relevant to the query. Messages can similarly be processed for efficient processing based on whether the message contains data corresponding to specific subdivisions.

Various methods of associating a message with its corresponding subdivision for each LHDS are contemplated including, but are not limited to, specifying the at least one subdivision for each LHDS in a header of the message or including the at least one subdivision for each LHDS in metadata for the message.

Various methods of associating a file with its corresponding subdivision for each LHDS are contemplated including, but are not limited to, naming the file using the hierarchical path identifiers for each common subdivision of each logical hierarchical data space, storing the hierarchical path identifiers for each parent subdivision of each LHDS in the file, storing the hierarchical path identifiers for each parent subdivision of each LHDS in the file metadata, storing the hierarchical path identifiers for each common subdivision of each LHDS in another database, storing the hierarchical path identifiers for each common subdivision of each LHDS in another file, or registering hierarchical path identifiers for each common subdivision of each LHDS with a registrar.

A registrar manages the association between a subdivision of an LHDS and objects such as files, data blocks, subblocks, pages, file metadata, data block metadata, subblock metadata, page metadata, or statistics. A registrar may support operations on these associations including, but not limited to, creation, retrieval, update, query, and deletion. A registrar may be implemented in multiple ways including, but not limited to, a software service, using a database, in-memory data structures, maps, trees, physical hierarchical data spaces, disk-based data structures, graphs, or persistent cache.

Figure 2:
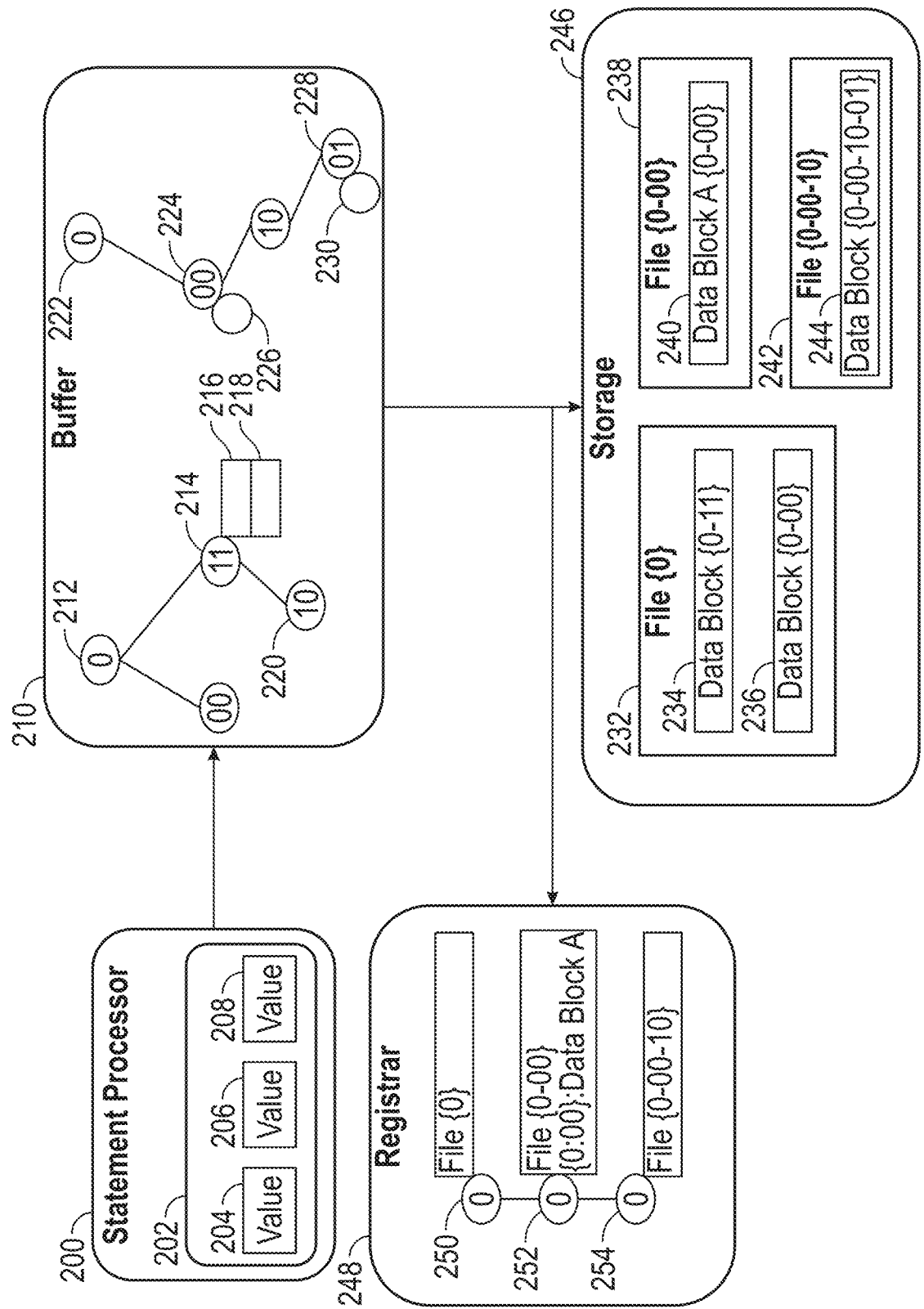
FIG. 2 shows a system for storing information in one or more files comprised of data blocks associated with subdivisions of a logical hierarchical data space according to various embodiments.

FIG. 2 shows a system for organizing information in files using hierarchical data spaces. Statement processor 200 transforms a statement for performing operations on one or more relations into operations in one or more hierarchical data spaces. A hierarchical data space operation is an operation that uses one or more hierarchical path identifiers to accomplish a given task. Step 118 of FIG. 1B, storing a tuple in a data block using a hierarchical path identifier, is an example of a hierarchical data space operation.

A statement comprises at least one operation on at least one relation, set, map, list, collection, or group of data items. Statements can be written in any declarative language such as SQL, any imperative language such as C or Java, or a combination. Statement elements may include but are not limited to expressions, operators, functions, constants, conditions, variables, values, and sub-statements.

Tuple 202 contains values 204, 206, and 208. Statement processor 200 chooses one or more logical hierarchical data spaces for the operation, generates at least one tuple for the operation, and determines the subdivisions of the one or more logical hierarchical data spaces by generating hierarchical path identifiers for the at least one tuple. The at least one tuple can now be stored in a data block, the data block associated with the subdivisions using one or more hierarchical path identifiers, and the file associated with the deepest common subdivision for all data blocks in the file.

In at least one embodiment, the at least one tuple is first stored in a buffer component 210. In another embodiment, the original data values can be stored in a buffer and then one or more tuples generated when the contents of the buffer are stored. Buffer component 210 can buffer the at least one tuple in at least one buffer corresponding to the subdivision of the at least one LHDS for the tuple. Various embodiments for buffering the tuples in at least one buffer corresponding to the subdivision are supported, but not limited to, buffering the tuples in a memory or disk buffer identified by a hierarchical path identifier, buffering the tuples in a map using a hierarchical path identifier as the key, buffering using a circular buffer, buffering using a cyclic buffer, buffering using ring buffer, buffering using disk buffer, buffering using RAM buffer, buffering using physical hierarchical data space, or using a variety of buffering techniques in combination.

In at least one embodiment, the buffer uses at least one physical hierarchical data space to group tuples corresponding to the same subdivision in an LHDS together before writing to a file. Physical hierarchical data spaces provide an efficient way to maintain the hierarchy of the logical hierarchical data space. This allows for data associated with the subdivisions of the hierarchical data space and their child subdivisions to be efficiently written to the same file, each subdivision corresponding to a separate data block. This also allows an efficient way to write a data block corresponding to a subdivision with sub data blocks that correspond to its child subdivisions.

Without using a memory buffer to write tuples corresponding to a subdivision together to a data block at one time, a buffering method of allocating and reallocating space in a file for the data blocks may be used. A data block may be written with empty space to allow for new tuples to be added if necessary. If there is not enough space for new tuples, then the data block may be copied to a new data block with extra space allocated. When all writing to a file is completed, the data blocks may be rewritten to eliminate the extra space.

Physical hierarchical data space 212 buffers tuples. Tuple 216 and tuple 218 are shown in subdivision 214 {0-11}. For example, physical hierarchical data space 212 could correspond to physical hierarchical data space A in FIG. 1B, organizing tuples by the "Name" attribute. Physical hierarchical data space 222 is buffering tuples that point to tuples in other hierarchical data spaces. It could correspond to physical hierarchical data space B in FIG. 1B. Tuple 226 is shown in subdivision 224 {0-00} and tuple 230 is shown in subdivision 228 {0-00-10-01}. Tuples may contain hierarchical path identifiers that point to tuples stored in other physical hierarchical data spaces. For instance, tuple 226 may be pointing to tuple 216 while tuple 230 may be pointed to tuple 218. This allows queries to use physical hierarchical data space 222 to search by an attribute corresponding to its hierarchical data space. The result of this search is a set of tuples that point to the subdivisions in physical hierarchical data space 212 that contain candidate tuples that may have the same value for that attribute. For example, a query for a given location could use physical hierarchical data space B to find a tuple that points to the tuple in physical hierarchical data space A that has all the attributes.

Buffer component 210 will flush subdivisions of the hierarchical data spaces when those subdivisions and their children have reached a threshold. Various embodiments for deciding when to flush the tuples to files are contemplated, including, but not limited to when a maximum number of tuples are buffered in a subdivision, the total size of the tuples being buffered in a subdivision, the length of time the tuples have been in the subdivision, or based on an external signal. Since the root of a physical hierarchical data space is also a subdivision, these thresholds also apply to the entire physical hierarchical data space. Since the threshold policies are likely to vary based on use case or metrics, they can be parameterized or even changed dynamically.

When the threshold is reached for a subdivision, buffer component 210 will recursively traverse the subdivision and its children of the physical hierarchical data space writing the tuples to data blocks of one or more files. This process determines how to split the data between one or more files. It can do this based on target file size, minimum file size, maximum file size or other criteria. If the buffer holds enough data, traversing the physical hierarchical data space depth-first will facilitate locating subdivisions that are close in the hierarchy together in the same file.

While buffer component 210 is showing two physical hierarchical data spaces, physical hierarchical data space 212 and physical hierarchical data space 222, a single physical hierarchical data space could be used to buffer the tuples for many tables or relations. Buffer component 210 could also use multiple physical hierarchical data spaces for each table or relation.

Buffer component 210 will write the files to storage 246. Various embodiments for storing tuples are contemplated, including, but not limited to cloud storage, hard drive storage, solid state storage, storage appliances, object storage, block storage, archival storage, tape storage, optical disk, RAM, or other data storage device. Files can also be virtual, composed of data blocks or blocks of other files.

When a file is written to storage 246, the association between the file and subdivision of the at least one LHDS may be registered with registrar 248. That association may also contain a map between each data block and subdivision of the at least one logical hierarchical data space. By registering the file and the data blocks based on a subdivision of at least one logical hierarchical data space, operations can quickly find the files and data blocks that may contain tuples for the corresponding hierarchical path identifiers. By using physical hierarchical data space 250 to maintain the registration of each file and their corresponding subdivision of the at least one logical hierarchical data space, the registrar can rapidly determine the relevant files for the operation. This provides a highly scalable way to manage massive quantities of data at a granular level. For instance, a petabyte of data could be stored in one million 1 GB sized files. Each of those one million files can be registered in physical hierarchical data space 250. An operation on a single specific subdivision, such as subdivision 254, can quickly retrieve the files that cover or intersect subdivision 254. Those files can then be accessed to perform the operation.

The information registered in subdivision 252 about the file contains a mapping of a subdivision identified by HPId {0-00} to a data block {Data Block A}. By including mappings of subdivisions to data blocks, the relevant data blocks for an operation can be accessed instead of loading the entire file. It is possible for there to be billions of subdivisions for exceptionally large data sets. If the data or tuples for each subdivision are stored in their own data block, the number of file mappings needed to be managed by the registrar could become very large. If the data blocks maintain the hierarchy of the hierarchical data space, then instead of storing all the mappings from subdivisions to data block offsets, mappings can be stored for a chosen set of data blocks that are parent subdivisions to the other data blocks. In this way, the amount of data stored in each registration can be limited. The metadata, including statistics, for each file and data block may also be stored in registrar 248.

The data blocks may be stored with metadata or associated with metadata that allows the data blocks to be filtered based on specified conditions. Various embodiments for generating the metadata needed to support filtering are contemplated including, but not limited to storing the range for a given attribute in the metadata, storing a bloom filter in the metadata for each attribute or combinations of attributes, or storing hierarchical path identifiers for at least one attribute in the metadata. The at least one HPId may be encrypted while preserving the hierarchy of its hierarchical data space.

Hierarchical path identifier for at least one logical hierarchical data spaced can be computed for the value of each attribute. For example, value 204 may be for the "Name" column or attribute. Value 206 may be for the "Birth Date" column or attribute. Value 208 may be for the "Location" column or attribute. an HPId for the "StringSpace1" first logical hierarchical path space may be generated for value 204. A second HPId for the "StringSpace2" second LHDS may also be generated for value 204. an HPId for the "DateTimeSpace1" first logical hierarchical path space may be generated for value 206. A second HPId for the "DateTimeSpace2" second LHDS may also be generated for value 206. an HPId for the "GeospatialSpace1" first logical hierarchical path space may be generated for value 208. A second HPId for the "GeospatialSpace2" second LHDS may also be generated for value 208. This may occur for all the tuples stored in a data block. The deepest parent subdivision can be computed for all the hierarchical path identifiers generated in each space. That deepest parent subdivision can be included for corresponding attribute in the metadata about the data block. This allows the metadata for each data block to be evaluated probabilistically to determine if it may contain any tuples that probabilistically matches a specified condition.

Multiple files and multiple data blocks may correspond to the same subdivision. For example, file 232 has data block 234 with HPId {0-11} and data block 236 with HPId {0-00} while file 238 also has a data block 240 that corresponds to subdivision with HPId {0-00}. File 242 has a file {0-00-10} with data block 244 with HPId {0-00-10-01}. File 242 has a subdivision {0-00-10} that is an immediate child subdivision of {0-00}.

Figure 3A:
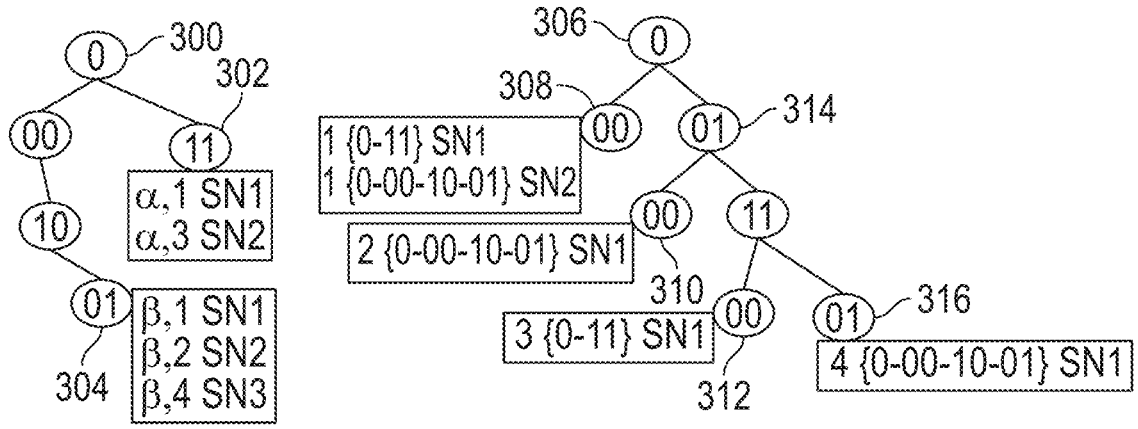
FIG. 3A shows tuples organized in hierarchical data spaces according to various embodiments.

FIG. 3A shows tuples organized in hierarchical data spaces. Physical hierarchical data space 300 contains a set of tuples from relation 334 and relation 336. Tuple ($\alpha$,1) is located subdivision 302 {0-11} because data value a corresponds to subdivision {0-11} of the logical hierarchical data space. This tuple has sequence number (SN) of 1. Each subdivision of the at least one LHDS may issue sequence numbers unique to the subdivision to identify each tuple. Tuple ($\alpha$,3) is also located in subdivision 302 {0-11} because data value a corresponds to subdivision {0-11}. The value of $\alpha$ is projected into a hierarchical data space in subdivision 302 {0-11}. Tuple ($\beta$,1) is in subdivision 304 {0-00-10-01} because data value $\beta$ corresponds to subdivision {0-11}. The value $\beta$ is projected into the hierarchical data space in subdivision 304 {0-00-10-01}. Tuple ($\beta$,2) and tuple ($\beta$,4) are also located in subdivision 304 {0-00-10-01}. Each data attribute for relation can be kept in each tuple.

Physical hierarchical data space 306 contains tuples from relation 334 and relation 336. These tuples are placed in the subdivisions for the hierarchical path identifiers for the value of column B. These tuples point to the subdivisions in physical hierarchical data space 300 that contain the tuples for each relation. This allows the hierarchical path identifiers for the values in column B to be used to find the tuples for the row. To find the tuples where the column B value is 3 with HPId {0-01-11-00}, the tuples stored in subdivision 312 {0-01-11-00} are accessed. Tuple (3, {0-11}) is found. This tuple points to the subdivision 302 {0-11} of physical hierarchical data space 300. The tuples present there are ($\alpha$,1) and ($\alpha$,3). The tuples can then be evaluated to see if its column B value matches 3. Tuple ($\alpha$,3) matches, and it is therefore the result. This method allows multiple physical hierarchical data spaces to be used to store and probabilistically query relationships between the attributes of a relation.

Figure 3B:
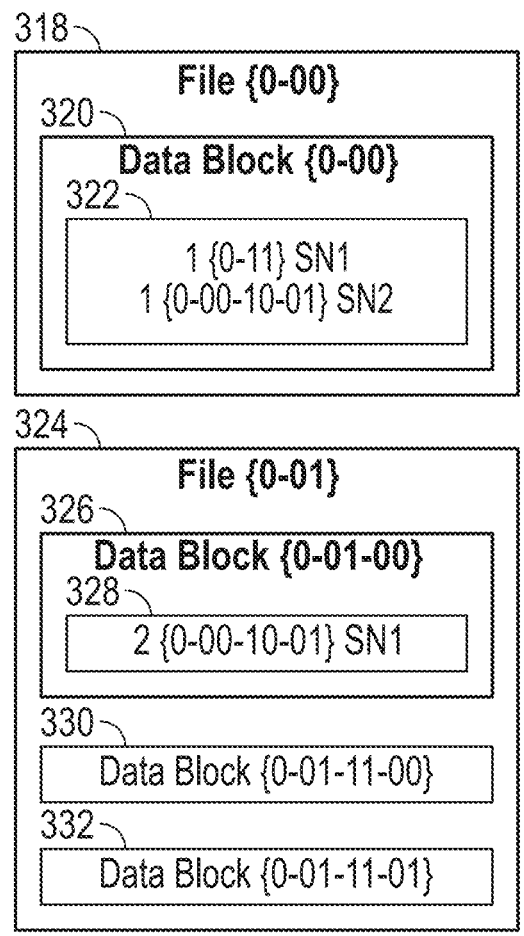
FIG. 3B shows information stored in one or more files and data blocks corresponding to at least one subdivision of at least one logical hierarchical data space using hierarchical data spaces according to various embodiments.

FIG. 3B shows information stored in one or more files and data blocks corresponding to at least one subdivision of at least one LHDS using hierarchical data spaces. The tuples from physical hierarchical data space 306 are stored in a set of files and data blocks. File 318 and File 324 store correspond to different subdivisions of the hierarchical data space. File 318 contains a data block 320 {0-00} which corresponds to subdivision {0-00}. Data block 320 stores the tuples (1, {0-11}) and (1, {0-00-10-01}) from subdivision 308. These tuples are stored in a subblock 322 of region 318. File 324 stores subdivision 314 {0-01}. Data block 326 contains tuple 328 from subdivision 310. Various embodiments for arranging the data blocks in a file are contemplated, but not limited to, storing all the data blocks at the same level of the file, or arranging the data blocks in the file in a way that preserves the hierarchy of a hierarchical data space. Storing the data blocks while preserving the hierarchy of a hierarchical data space provides for more efficient input/output when searching for tuples in specific subdivisions. This also allows for subdivisions with a minimum number of tuples to be aggregated in parent subdivisions. Data block 330 {0-01-11-00} and data block 332 {0-01-11-01} are shown in FIG. 3B arranged in a flat arrangement.

FIG. 3C shows two relations with values and hierarchical path identifiers for two columns. FIG. 3D shows tuples from relation 334 and relation 336 stored in multiple files, data blocks, and subblocks corresponding to the subdivisions of a hierarchical data space. File 338 {0-00} contains a region 340 {0-00-10-01}. Instead of all the attributes of the tuples being stored together like they are in subblock 322, the attributes of the tuples from subdivision 304 are shredded and stored as a column of values. For instance, subblock 342 holds the value $\beta$ for tuples ($\beta$,1), ($\beta$,2), and ($\beta$,4). Subblock 344 holds the values 1, 2, 4 for ($\beta$,1), ($\beta$,2), and ($\beta$,4). Subblock 346 holds sequence numbers assigned to the tuples ($\beta$,1), ($\beta$,2), and ($\beta$,4). The reason for shredding them into different lists of values is that grouping values together that have the same data type allows them to be more efficiently compressed. Subblock 342 can use run length compression to store the value $\beta$ once for three tuples. File 348 {0-11} contains tuples corresponding to subdivision 302. These tuples are stored in region 350. The tuples are split by attribute in subblock 352 and subblock 354 and subblock 356. By shredding the tuples by attribute into multiple subblocks, operations that access specific attributes can avoid the input/output cost of loading subblocks for irrelevant attributes. The sequence numbers for the tuples are stored in subblock 356. Sequence numbers may be assigned to tuples corresponding to a subdivision of the at least one logical hierarchical data space. Sequence numbers corresponding to a subdivision are independent from every other subdivision. In other words, sequence numbers are not unique across subdivisions, but they are unique for a subdivision. By assigning sequence numbers, each tuple can be identified by its corresponding subdivision in each LHDS and by the sequence number.

A benefit of using hierarchical data spaces to organize information is that it is highly likely that information stored together in a subdivision is similar. The tuples may have the same value for the attribute used to generate their hierarchical path identifier. Values of other attributes of each tuple may also be highly likely to be similar in value or range. Values that are similar or have the same data type and are in a limited range can be compressed very efficiently. For example, in subblock 342, $\beta$ (3) denotes the value $\beta$ repeats 3 times. This run-length compression can substantially reduce the amount of storage required.

Tuples in the same subdivision can be sorted by multiple attributes to further improve compression ratio. Once tuples are grouped in this way by a subdivision of their at least one logical hierarchical data space, sorting the tuples of a single subdivision is much more efficient than sorting the entire set of tuples.

Figure 4A:
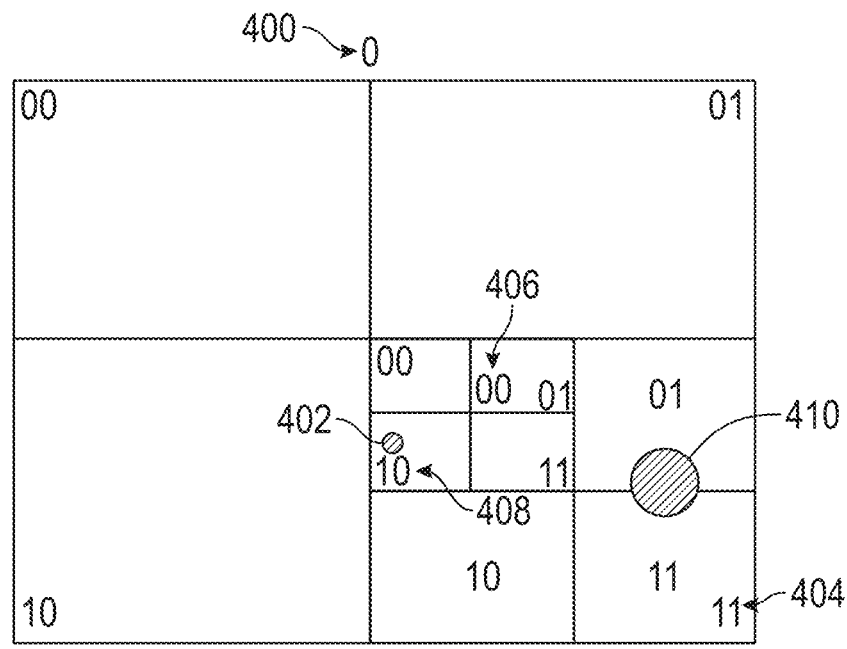
FIG. 4A shows a subset of hierarchical subdivisions for a hierarchical data space and values corresponding to various subdivisions of the hierarchical data space according to various embodiments.

FIG. 4A shows a subset of hierarchical subdivisions for a hierarchical data space and values corresponding to various subdivisions of the hierarchical data space. In various embodiments, the method may be used with hierarchical data spaces that include one or more dimensions. In the illustrated embodiment, the hierarchical data space has two dimensions. The initial data space 400 is subdivided into four quadrants. Since data value 402 is in subdivision 404 {11} of data space 400, the label {11} is appended to the initial data space's HPId {0} depth 0, resulting in HPId {0-11} with depth 1. Depth indicates the number of steps from the root of the data space that the HPId includes. Depth can also be viewed as the number of subdivisions from the root of the data space. For instance, in the illustrated embodiment, depth 1 indicates that the HPId includes one step from the root or the first subdivision. Depth 10 would indicate that the HPId represents a path with 10 steps or 10 subdivisions from the root. Since data value 402 is located in subdivision 404 {11} of initial data space 400, subdivision 404 {11} of data space 400 is chosen to be subdivided. Since data value 402 is in subdivision 406 {00} of subdivision 404, {00} is appended to the hierarchical path identifier, resulting in path {0-11-00} with depth 2. The next subdivision containing data value 402 is subdivision 408 {10}, resulting in path {0-11-00-10} with depth 3. The recursive process may continue until the depth reaches the maximum depth or the data value is no longer contained in a single subdivision. Data values with size and shape may not reach the maximum depth while point values reach a maximum depth. The result is the HPId shown in tuple 402.

Since the HPId may terminate before maximum depth is reached, there can be many subdivisions with greater depth beneath this hierarchical path identifier. Thus, in at least one embodiment, HPId {0-11-00-10} depth 3 shown in tuple 402 may be used to indicate an interest in the subdivision plus all its child subdivisions and all its parents all the way to the root.

FIG. 4A also shows a query 410 that crosses a boundary of two subdivisions. The HPId generated for query 410 would be {0-11} (Depth 2) because it is not fully contained in {0-11-01} or {0-11-11}. Therefore, all of node 404 {0-11} and its children would have to be accessed in any query.

Figure 4B:
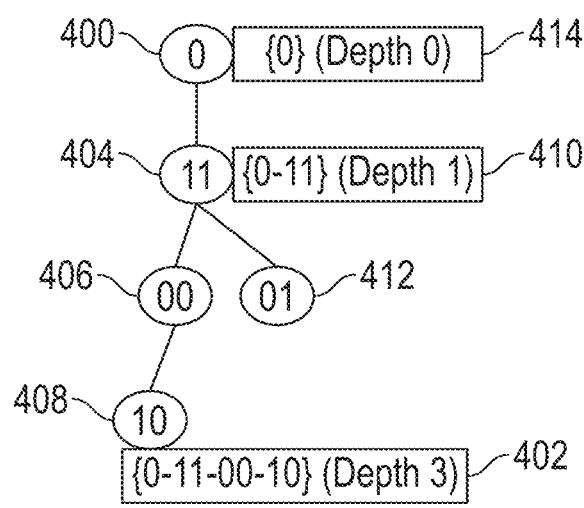
FIG. 4B shows a physical hierarchical data space containing tuples with values corresponding to the various subdivisions of the logical hierarchical data space of FIG. 4A according to various embodiments.

FIG. 4B shows a physical hierarchical data space containing tuples with values corresponding to the various subdivisions of the LHDS of FIG. 4A. Node 400 corresponds to the root of the LHDS 400 {0} in FIG. 4A. Node 404 corresponds to subdivision 404 {0-11} in FIG. 4A. Node 406 corresponds to subdivision 406 {0-11-00}. Node 408 corresponds to subdivision 408 with path {0-11-00-10} in FIG. 4A. The calculated HPId {0-11-00-10} depth 3 describes the path to node 408 in the physical hierarchical data space. Since HPId 408 can also be used to indicate interest in node 408 and any of its children, hierarchical path identifiers can be used for performing certain types of queries such as range, bounding, and intersection queries. For instance, a query can go to the subdivision 404 {0-11} specified by the HPId and then evaluate all the data tuples in that subdivision and search all child subdivisions. The hierarchical nature of this method may be employed to provide that all values contained by 404 {0-11} are contained in its child subdivisions.

Because of the preservation of hierarchy in hierarchical data spaces, a container capable of holding or storing data that corresponds to subdivision {0-11-00-10} may hold or store data corresponding to subdivision {0-11-00-10} or any of its child subdivisions. It may not hold or store data for any other subdivisions. For example, a container that corresponds to subdivision {0-11-00-10} may not hold or store data with corresponding subdivision {0-11-00} or corresponding subdivision {0-11-00-11}.

A value that corresponds to a subdivision may be held or stored in that subdivision or in any of the subdivision's parent subdivisions. It may not be held or stored in the subdivision's children. Value 402 corresponds with subdivision {0-11-00-10}. It also corresponds with subdivision {0-11-00}, subdivision {0-11}, and subdivision {0}. Value 402 may not be stored or held in a container with that is a child of subdivision {0-11-00-10} because there is no way to know which child subdivision corresponds to the data value. {0-11-00-10} depth 3 does not specify any subdivisions past depth 3.

Value 414 corresponds with subdivision 400 {0} but does not correspond with subdivision 404 {0-11}. This is because the HPId does not specify any subdivisions past depth 0. Value 410 corresponds with subdivision 404 {0-11} and subdivision 400 {0}. Value 410 does not correspond with subdivision 406, subdivision 408, or subdivision 412.

Figure 5A:
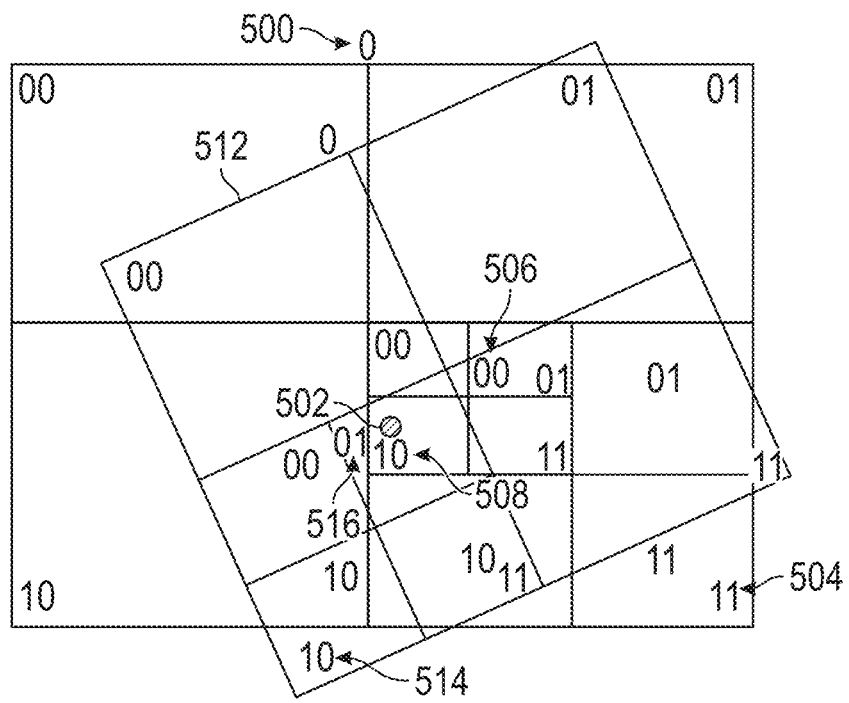
FIG. 5A shows a subset of hierarchical subdivisions for two different hierarchical data spaces and values corresponding to various subdivisions of the hierarchical data spaces according to various embodiments.
Figure 5B:
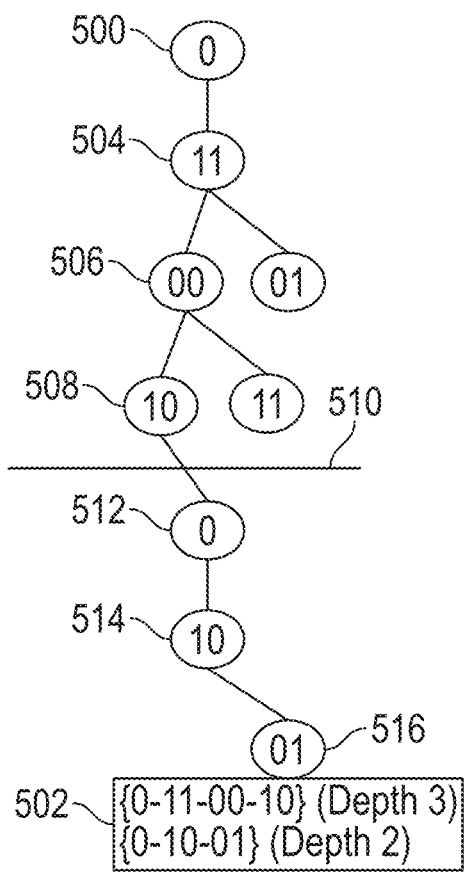
FIG. 5B a physical hierarchical data space containing tuples with values corresponding to the various subdivisions of two different logical hierarchical data spaces of FIG. 5A according to various embodiments.

FIG. 5A shows a subset of hierarchical subdivisions for two different hierarchical data spaces and values corresponding to various subdivisions of the hierarchical data spaces. Using multiple different logical hierarchical data spaces allows for more efficient queries of the contents of a physical hierarchical data space and more selective probabilistic filtering during those queries.

The initial LHDS 500 is subdivided into four quadrants. Since data value 502 is located in subdivision 504 {11} of data space 500, the label {11} is appended to the initial data space's HPId {0} depth 0, resulting in HPId {0-11} with depth 1. Since data value 502 is located in subdivision 506 {00}, {00} is appended to the hierarchical path identifier, resulting in path {0-11-00} with depth 2. The next subdivision containing data value 502 is 508 {10}, resulting in HPId 518 {0-11-00-10} with depth 3. If max depth is 3 or the data value was contained in multiple child subdivisions, the process would terminate.

The second LHDS 512 is different from the first LHDS 500. In the illustrated embodiment, LHDS 512 is scaled, translated, and rotated. Data value 502 has a different path through the subdivisions in LHDS 512 than in LHDS 500. To get improved selectivity through using multiple logical hierarchical data spaces, those logical hierarchical data spaces must be different.

The second LHDS 512 is subdivided into four quadrants. Since data value 502 is located in subdivision 514 {10} of data space 512, the label {10} is appended to the initial data space's HPId {0} depth 0, resulting in HPId {0-10} with depth 1. Since data value 502 is located in subdivision 516 {00}, {01} is appended to the hierarchical path identifier, resulting in path {0-10-01} with depth 2. If the tuple is contained in multiple child subdivisions or max depth is reached, the process stops.

FIG. 5B shows a physical hierarchical data space containing tuples with values corresponding to the various subdivisions of two different logical hierarchical data spaces shown in FIG. 5A. Node 500 corresponds to the root of the LHDS 500 {0} in FIG. 5A. Node 504 corresponds to subdivision 504 {0-11}. Node 506 corresponds to subdivision 506 {0-11-00} in FIG. 5A. Node 508 corresponds to subdivision 508 with path {0-11-00-10}. The calculated HPId {0-11-00-10} depth 3 describes the path to node 508 in the physical hierarchical data space. Node 508 is connected to a subtree or subgraph representing the subdivisions and hierarchy for a second hierarchical data space 512. This subtree has a node 512 {0} with a child node 514 {0-10} corresponding to subdivision 514. Node 514 has a child node 516 corresponding to subdivision 516. Node 514 has a tuple corresponding to data value 502. A tuple with hierarchical path identifiers corresponding to a data value with two different logical hierarchical data spaces can therefore be stored in a single physical hierarchical data space. The benefit is that there may be many tuples that have the same HPId {0-11-00-10} for the first LHDS but have different hierarchical path identifiers for the second logical hierarchical data space. By storing them in an attached subtree representing the subdivisions of the second logical hierarchical data space, the tuples are more distributed. A query with hierarchical path identifiers for both hierarchical data spaces can therefore walk through the nodes of the physical hierarchical data space, avoiding having to access tuples that are not on the query path.

Figure 6A:
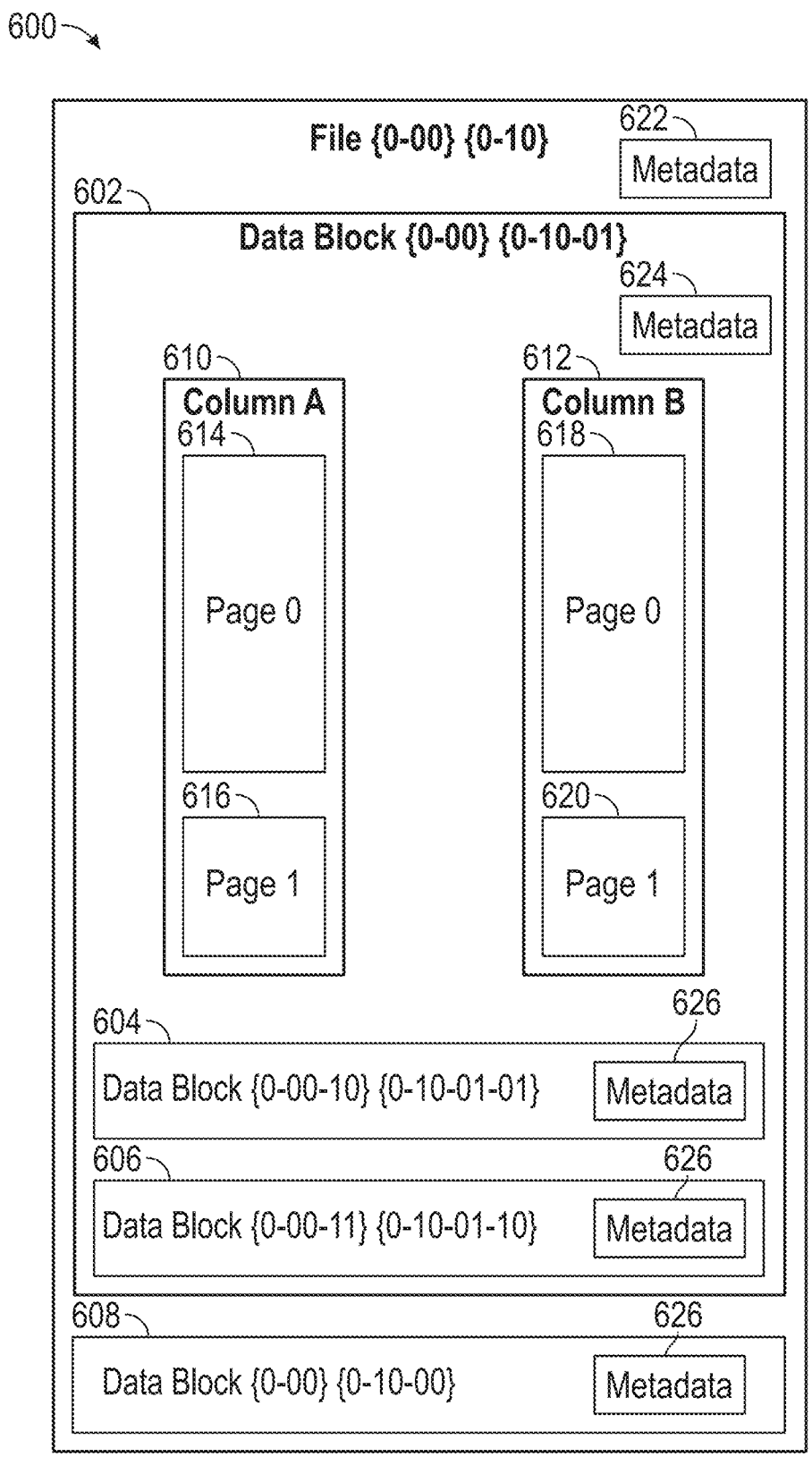
FIG. 6A shows information organized in data blocks of at least one file wherein the file and data blocks correspond to subdivisions of two different logical hierarchical data spaces according to various embodiments.

FIG. 6A shows a method of organizing information in data blocks of at least one file wherein the file and data blocks correspond to subdivisions of two different logical hierarchical data spaces and preserve the hierarchy of each logical hierarchical data space. File 600 contains tuples with hierarchical path identifiers that correspond to subdivision {0-00}. These hierarchical path identifiers may be the same as subdivision {0-00} or be child subdivisions such as {0-00-10} or {0-00-10-01}. Since files correspond to a subdivision of at least one logical hierarchical data space, it can be quickly determined for an operation on a hierarchical data space which files apply. File 600 has two hierarchical path identifiers. That is because each file can correspond to one or more different logical hierarchical data spaces. By using multiple different logical hierarchical data spaces, the operations using hierarchical path identifiers can be performed more efficiently. This is because each hierarchical data space enhances the selectivity of the access or query. An operation with hierarchical path identifiers {0-00} {0-10-01} matches the file's hierarchical path identifiers in both hierarchical data spaces. However, an operation with HPId {0-00} {0-01} matches in just one hierarchical data space {0-00} and not {0-10}. Therefore, the file can be skipped because it does not contain any tuples relevant to the operation.

The subdivisions for a file are calculated by finding the deepest parent subdivision for all the data block subdivisions. File 600 {0-00} is calculated by finding the deepest parent subdivision of {0-00}, {0-00}, {0-00-10}, and {0-00-11}. Since the data blocks in FIG. 6A preserve hierarchy, only the top-level data blocks need to be used. In this case, {0-00} for both region 602 and region 608. The second subdivision for the file is found in the same way. {0-10} is determined by finding the deepest parent subdivision of {0-10-01} and {0-10-00}. {0} is a parent subdivision of both, but {0-10} is deeper in the hierarchy and a parent to both. Therefore file 600 has subdivisions {0-00} and {0-10}.

File 600 contains a data block 602 {0-00} {0-10-01}. The contents of data block 602 are stored before child data block 604 and child data block 606. This is called pre-order. The contents could also be stored in-order or post-order. The same probabilistic filtering on files provided by using multiple hierarchical data spaces also works on data blocks. For example, an operation with HPId {0-00} {0-10-00} matches both hierarchical path identifiers for the file but does not match for data block 602. Data block 602 is the parent data block of data block 604 and data block 606. Since data block 604 and data block 606 correspond to subdivisions of data block 602, they are also excluded from being accessed. Unlike flat probabilistic data structures such as bloom filters that do not preserve either hierarchy or the path through a hierarchical data space, this method allows for very efficient arrangement of data within files for rapid access while minimizing input/output. The subdivisions {0-00} {0-10-00} do match data block 608 {0-00} {0-10-00} and it would be relevant to the operations With this method of organizing data in files using subdivisions of at least one logical hierarchical data space, information can be stored in data blocks in any of these formats. In fact, a file can be stored in a data block of another file. That file can be organized using logical hierarchical data spaces. This method supports a fully recursive model.

Data in any form can be stored in the data blocks. Tuples are simply a generic name for data with one or more elements. If the file and data blocks are organized using subdivisions of logical hierarchical data spaces, the data they contain can be efficiently accessed using hierarchical path identifiers and hierarchical probabilistic filtering.

Data block 602 is shown with data organized in subblocks labeled Column A and Column B. Subblock 610 contains page 614 and page 616. Subblock 612 contains page 618 and 620. By storing tuples in multiple subblocks, the values for an attribute from multiple tuples can be stored together. By storing the values for an attribute from multiple tuples together, the values may be more efficiently compressed than if all the values for all the attributes of a tuple are compressed together. In some circumstances an operation that only accesses a limited number of attributes can avoid IO. By dividing data blocks into subblocks, or pages, IO may be reduced. Pages are typically sized by the size of a block on the storage device to optimize IO. Pages can also be associated with subdivisions of logical hierarchical data spaces for the tuples that they contain. These associations could be stored with the pages or with metadata in the file or data block. That way the pages that need to be accessed can be filtered using hierarchical probabilistic filtering.

File 600 contains metadata 622. File metadata may include a data block map 638 as shown in FIG. 6C. File metadata may include the location of each data block in the file. File metadata may include a timestamp when the file was created or a time interval covering the tuples in the file. The file metadata may also include hierarchical path identifiers for different attributes contained in the file so that the contents of the file may be probabilistically filtered by these attributes. For instance, each tuple may correspond to a time interval or a timestamp. A time interval covering all tuples could be calculated. One or more hierarchical path identifiers or encrypted hierarchical path identifiers could be generated and stored in the metadata for one or more hierarchical data spaces using the time interval value and stored in the file metadata. File metadata may also include statistics about the contents of the data blocks, subblocks, or pages. Statistics may include, but are not limited to, the size of the tuples, the age of the tuples, average size of the tuples, median size of the tuples, whether the tuples have been encrypted, whether the tuples have been compressed, the compressed size of the tuples, and compression ratio of the tuples. Statistics for each data block may be aggregated and stored in their parent data block or in the file.

Data block 602 contains metadata 624. Data block 604 contains metadata 626. Data block 606 contains metadata 628. Data block 608 contains metadata 630. The data block metadata may also include, but is not limited to, the location of the data block in the file, the size of the data block, the format of the data block, the location of any child data blocks, the location of any subblocks, the location of any pages, the size of any child data blocks, the size of any subblocks, the size of any pages, the attribute associated with each subblock, the attribute or attributes associated with each page, a timestamp, or the compression used to compress the contents of the data block.

Figure 6B:
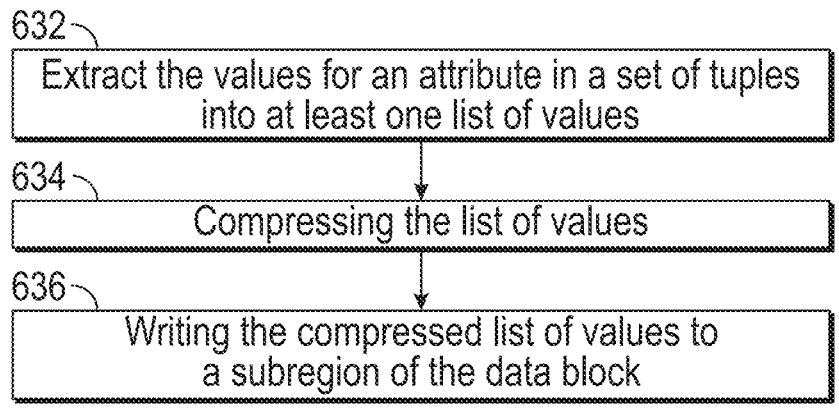
FIG. 6B shows a method of shredding a tuple into at least one column of values, compressing the column of values, and writing the column of values to a subblock of a data block according to various embodiments.
Figure 6C:
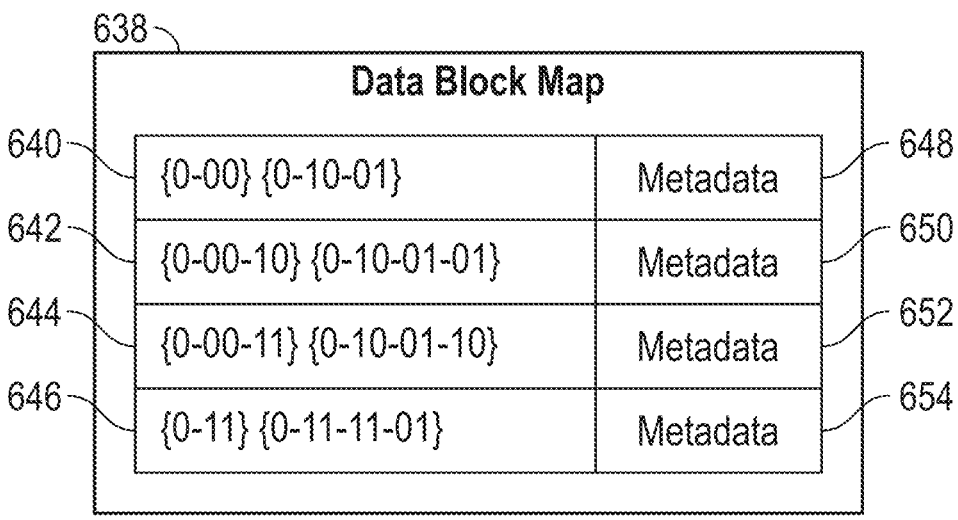
FIG. 6C shows a data block metadata map using hierarchical path identifiers according to various embodiments.

FIG. 6B shows a method of shredding a tuple into at least one column of values, compressing the column of values, and writing the column of values to a subblock of a data block. Data block 602 of FIG. 6A contains subblocks 610 and 612, each containing the values for different attribute for a set of tuples. Step 632 extracts the values for an attribute from a set of tuples into a list of values. Step 634 compresses those values using an appropriate compression technique for the data type of the attribute. Step 636 then writes the compressed values to a subblock of a data block. This method could also be performed by extracting the value for an attribute from a single tuple, decompressing an existing set of values, appending the value from the tuple, and compressing the entire list of values. The result could be written to a new file or to a new data block of an existing file. If extra space was allocated in the existing data block and the new set of values fit in that space, it could be written back to the data block.

FIG. 6C shows a method of organizing a data block metadata map using hierarchical path identifiers. This map holds the metadata for each data block. This metadata may include the location in the file for the data block and the size of the data block in bytes. Files, data blocks, and pages can be filtered using probabilistic spatial filtering to avoid serializing and evaluating unnecessary tuples. Files, data blocks, or pages that contain data for a given operation with hierarchical path identifiers can be found if there is a map from a subdivision in a hierarchical data space to a file and a data block, subblock, or page in a file. Data blocks, subblocks, and pages can be identified by their offset and size within the file. In some embodiments, size may be able to be implied from other known information such as the offsets of each data block. When the data blocks are in a flat form, size can be derived from the offsets. If the data blocks are stored inside other data blocks, the size is included in the map.

Map 638 shows the map of the data blocks contained by file 600. Data block 640 with subdivisions {0-00} {0-10-01} maps to metadata 648. Metadata 648 may be the same metadata as that stored in the file as metadata 624, or it may be a subset. Metadata 648 indicates the position of the data block and optionally the size of the data block in the file 600. It may also include statistics about the contents of the data block and any child data blocks, subblocks, or pages. Data block 642 has metadata 650. Data block 644 has metadata 652. Data block 646 has metadata 654. FIG. 6C shows a flat arrangement for the metadata. The metadata map can be arranged in a variety of data structures such as a hash map. In at least one embodiment, the data block metadata map will be kept using a physical hierarchical data space to preserve the hierarchy of the data blocks and speed up operations in the map.

An operation corresponding to subdivisions {0-00} {0-10-01} can find data block 628 in the map and go directly to the offset in data block metadata 640 and access the data stored at that location. This allows the operation to minimize how much of the file is loaded and how much of the data in the file is evaluated for the operation.

In at least one embodiment, file metadata offsets are the actual position within the file. In another embodiment, they could be an identifier that maps to the actual position within the file.

Files can store the map in their metadata so that a file reader can load the map and find a given data block, subblock, or page without scanning the entire file. However, these maps cannot be loaded without also accessing at least a part of the file. FIG. 2 shows a system with a registrar containing a set of files and the parent subdivision for all the data it contains. By storing the map in a registrar with the file and based on the files hierarchical path identifier, it can be determined if a data block, subblock, or page contains any data relevant to a given operation or query without having to loading and read the file. If is determined that a data block, subblock, or page contains data relevant to a given operation, the specific bytes for the data block, subblock, or page can be directly accessed if the storage system supports accessing a subset of the file.

A challenge with this approach is that a hierarchical data space could contain billions of subdivisions. If a data set is large enough and sufficiently distributed over those subdivisions, the registry kept by the registrar service and each entry in the registry could become extremely large. For instance, a petabyte data set could contain one million 1 GB files. Each of those 1 GB files could contain millions of data blocks. A registrar for this data set could contain one million file entries and each containing maps with a million entries. Finding the data blocks containing data relevant to the operation could be an expensive operation.

The registrar in FIG. 2 shows the files being organized using a physical hierarchical data space. This allows for very efficient search for files that are relevant to a given query since the files are registered by their hierarchical path identifiers and searching the registrar uses the hierarchical path identifiers of the operation to find the matching files. One the files are found, the entries for each file can be loaded and the map of data block metadata can be searched to find if any data block contains data relevant to the query. This map is also organized by hierarchical path identifier. Therefore, it can also be stored in a physical hierarchical data space for rapid search. The map can also be stored in a flat form such as a list or a map. However, it may be less efficient to search in the map in these forms than if the map is stored in a form that preserves the hierarchy of the corresponding hierarchical data space(s).

Figure 7A:
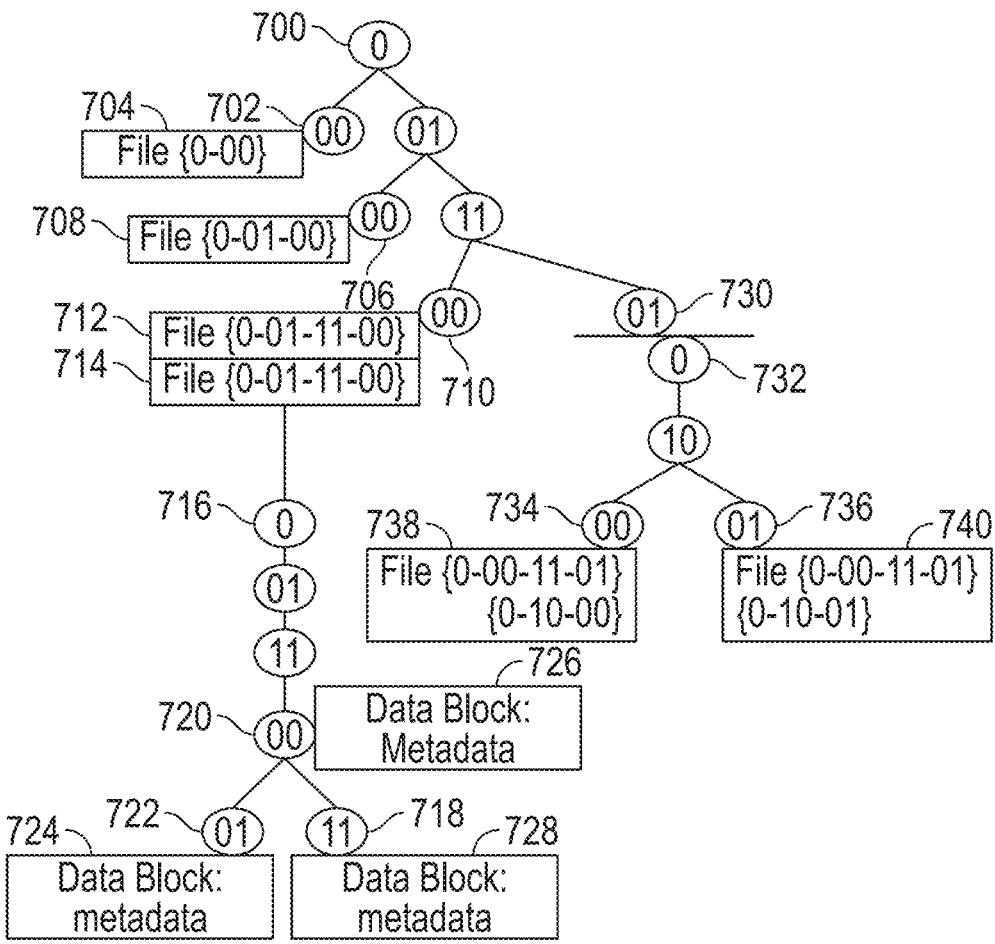
FIG. 7A shows file metadata and data block metadata stored according to their corresponding subdivisions of logical hierarchical data spaces according to various embodiments.

FIG. 7A shows a method for registering file and data block associations with their corresponding subdivisions of logical hierarchical data spaces. Physical hierarchical data space 700 contains a set of subdivisions. Each subdivision such as 702 can hold a file registration for a file or data block that contains information for the corresponding subdivision or children of the corresponding subdivision. Subdivision 702 contains file registration 704 {0-00}. Subdivision 706 contains file registration 708 {0-01-00}. Subdivision 701 contains file registration 712 and file registration 714. A subdivision can hold any number of files or data block registrations. For example, subdivision 710 contains file registration 712 and file registration 714. File registration 714 contains a physical hierarchical data space 716 that contains all the data block offsets arranged by hierarchical path identifier. For example, data block 726 {0-01-11-00} is stored in the physical hierarchical data space at subdivision 720. Data block 724 {0-01-11-00-01} is stored in subdivision 722. An operation that matches subdivision {0-01-11-00-01} can quickly find the data block offset 724 and go directly to the file and that region of the file. A bounding query operation that matches subdivision 720 {0-01-11-00} could access data block 726, data block 724, and data block 728 to find candidate tuples for the query operation. The bounding query operation could avoid accessing file 704, file 708 or any of the files under subdivision 730 since they are not subdivisions relevant to query {0-01-11-00}. The rules for which subdivisions are relevant vary based on the operation. Bounding queries have different rules for which subdivisions are accessed than intersection queries. Equality operations access specific subdivisions.

If there are many files in a subdivision, a set of nodes can be attached to the subdivision and the files organized by its HPId for a second hierarchical data space. This enables the ability to efficiently query large numbers of files and data blocks to find the ones that are relevant to an operation such as a query. For example, the file registrations for subdivision 730 are split into a second set of nodes or tree with root node 732 corresponding to a second logical hierarchical data space. This second hierarchical data space has different subdivisions than the first LHDS of physical hierarchical data space 700. Subdivision 734 contains a data block registration with a first HPId {0-00-11-01} and a second HPId {0-10-00}. Subdivision 736 contains a file registration 740 with a first HPId {0-00-11-01} and a second HPId {0-10-00}. Note that the first HPId for both file registrations is the same, {0-00-11-01}. However, they have different hierarchical path identifiers for the second hierarchical data space. An operation with a first HPId {0-00-11-01} would have to consider both file registrations but an operation with second HPId {0-10-01} would just consider file registration 738.

By storing the data blocks in a way that preserves the hierarchy of their corresponding hierarchical data space, a map can be registered that contains a limited number of subdivisions. In other words, some child subdivisions can be pruned to limit the size of the map. Since data blocks can preserve hierarchy, a parent subdivision can remain in the map while its child subdivisions are pruned. The register can still identify any files and their data blocks that may contain a match for the HPId for the operation. However, the match may identify the parent subdivision since the child subdivision may have been pruned. In this case, the data block for the parent is accessed and then its child data blocks are searched for any data blocks that match. Because the child subdivisions have been pruned, the operation cannot go directly to the child data block containing the data. Instead, it may need to be accessed through its parent data block. This trades efficiency as much of the parent data block may not be germane to the query. However, this effectively trades query efficiency against the size of the map metadata stored by the registrar. Preserving the hierarchy of a hierarchical data space in the file and using physical hierarchical data spaces to organize the file entries and maps in the registrar provide a much more efficient way to find and access relevant data for a given operation that using a flat model. Using multiple different hierarchical data spaces to organize the data in the files increases the selectivity of the searches and filtering of relevant files, data blocks, subblocks, and pages.

An alternative embodiment to keeping a full subdivision to data block metadata map is to find the files in the registry that contains a parent subdivision relevant to the operation. Then, the file metadata map can be loaded from the file to determine if any data blocks are present that apply to the operation. This allows the map stored in the registry to be pruned yet input/output can still be minimized. However, access is not as efficient as having the full metadata map in the registry or preserving hierarchy in the data blocks as an extra input/output is required to load the full map from the file itself.

Figure 7B:
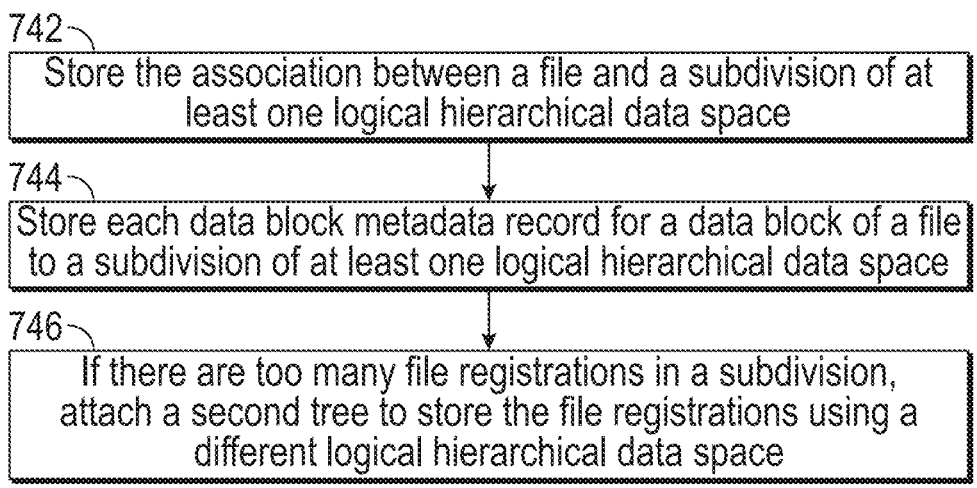
FIG. 7B shows a method for storing the association of a subdivision of at least one logical hierarchical data space with file metadata and data block metadata using hierarchical data spaces according to various embodiments.

FIG. 7B shows a method for storing the association of a subdivision of at least one LHDS with files, data blocks, and metadata using hierarchical data spaces. Step 742 stores the association between a file and subdivision of at least one logical hierarchical data space. The subdivision is the parent subdivision of all subdivisions associated with data blocks contained in the file. Step 744 stores the map of data block offset and the subdivision of at least one logical hierarchical data space. Step 746 uses a second tree to store the file registrations using a second LHDS when there are too many file registrations in the subdivision of the first logical hierarchical data space.

FIG. 8 shows the method of monitoring the subdivisions of at least one logical hierarchical data space, writing the contents of a subdivision to a region of a file, and determining when to create a new file. In at least one embodiment, step 802 checks at least one subdivision of the at least one LHDS to see if the amount of data exceeds a threshold defined in thresholds 804. Each subdivision tracks the amount of data it contains and how much data its child subdivisions contain. Step 802 can traverse all the subdivisions until it finds a subdivision that exceeds the threshold in 804. In at least one embodiment, each subdivision can track the last time it was written. Step 802 can then simply traverse the subdivisions until it finds a subdivision with a time that is older than the threshold. If the subdivision has reached a threshold as shown in decision 806, then the process simply repeats. In at least one embodiment, it will repeat periodically on a timer. In at least one embodiment, step 802 can check if a subdivision threshold has been exceeded each time a tuple is added to a subdivision or when the statistics for that subdivision and its parent subdivisions are updated. Various embodiments for different metrics for the thresholds are envisioned, including, but not limited to the amount of data in a subdivision or the length of time the data has been buffered in a subdivision.

If a subdivision does meet a threshold, then the subdivision and its children will be written to one or more files. Step 808 determines the next subdivision to write. It may start with the subdivision for which the threshold has been met. There are a variety of ways to traverse the subdivision and its children. A method can be called recursively to process the child subdivisions for a given subdivision. A subdivision can be written before or after its children are recursively processed. Writing the subdivision after the children are recursively processed is depth-first processing. Various embodiments are contemplated for processing the physical hierarchical data space including using recursion, using a stack to track the previous node, or including a parent pointer in each node so the algorithm can traverse back up the tree without using recursion or a stack, in order traversal, preorder traversal, post order traversal, or level order traversal. In depth-first processing, once all the child subdivisions are processed for a subdivision, the contents of the subdivision are written by step 810. Step 812 writes the tuples from a buffer corresponding to the subdivision to the current file in a data block for that subdivision. It may also write the metadata for the data block. Step 812 checks to see if the amount of data written to the file has exceeded a limit or threshold. Step 812 may also check to see if the amount of data written to the file plus the size of the contents to be written will exceed a limit or threshold. The maximum size for any file is configurable. If the file exceeds or will exceed a limit, it is closed in step 814. The file and metadata are registered with the registrar in step 816. A new file is then created in step 818. The process will continue by going back to step 809 if there are more subdivisions to process or subdivisions to write.

In an alternative embodiment, step 812 may be performed before step 810. If the file will exceed the limit if the subdivision tuples are written, then the current file may be closed in step 814. Step 816 will register the file, data blocks, and metadata. Step 818 will then start a new file. Step 812 will then be performed to write the data block to the newly created file. The process will continue by going back to step 809 if there are more subdivisions to process or subdivisions to write.

Figure 9A:
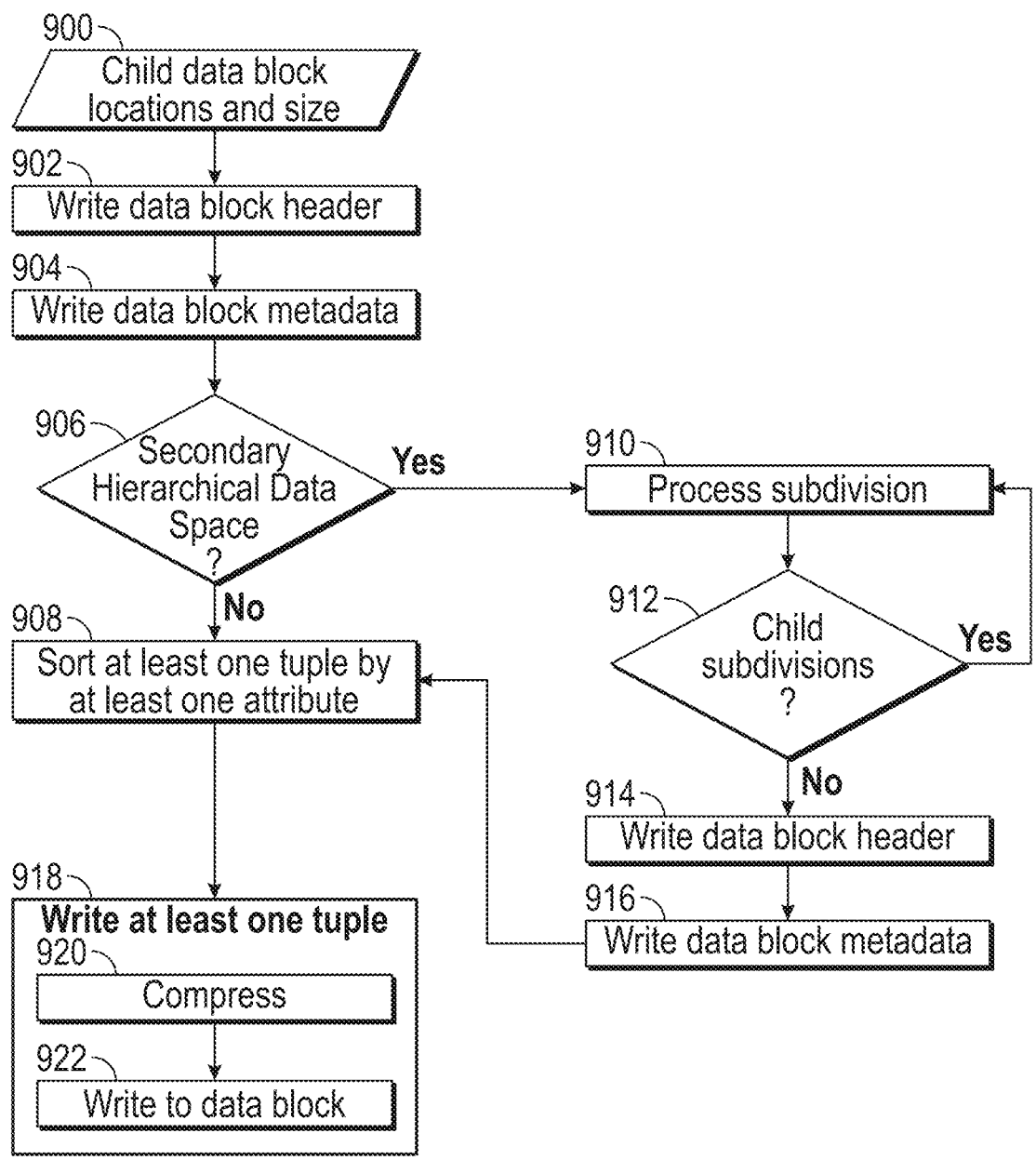
FIG. 9A shows a method for writing a subdivision of at least one logical hierarchical data space to data block of at least one file according to various embodiments.

FIG. 9A shows an embodiment for writing a subdivision of a physical hierarchical data space to a file or message. Files and messages can be sparse, in that those subdivisions with no tuples and no child subdivisions are not included. Child data block location and size metadata 900 are an input to the method. This is so that when a subdivision is written it can refer to the offset position in the file or message of its child data blocks. A data block header is written in step 902. This may include a flag indicating whether a child subdivision exists or not. In an alternate embodiment, the data block metadata may be included in the data block header. Step 904 writes the data block metadata to the file or message. This may include the location and size of all the data block's child data blocks, subblocks, or pages. In this depth-first approach, the data for the subdivision is written after the data for all its children. The advantage of encoding the physical hierarchical data space bottom to top is that the locations of each data block for a subdivision are readily available to their parent subdivisions and do not have to be precomputed. Various other embodiments for writing the contents of the subdivisions are contemplated, including but not limited to traversing the subdivisions of the hierarchical data space vertically from top to bottom, left to right; or writing the left subdivisions, the tuple area, and then the right subdivisions.

Step 906 checks to see if there is a tree for a second LHDS attached to the subdivision. If not, then step 908 will sort the at least one tuple by at least one attribute. Then step 918 will write the at least one tuple. This may include compressing the tuples in step 920. Step 922 will write the tuples to the data block.

If there is a secondary hierarchical data space found by step 906, then the subdivisions of this space will be written recursively starting in step 910. That process could also be performed in a variety of ways. The child subdivisions are traversed and written. Step 912 sees if a subdivision has any children and if so, then recursively calls step 910 to process each child. Step 914 writes the data block header which will typically include flags to indicate which children are present and the HPId for the subdivision. Step 916 will write any data block metadata. In an alternate embodiment, the metadata may be included in the data block header. Step 916 may call step 908 to sort the tuples by at least one attribute. Step 918 may also directly call step 918. If there are additional logical hierarchical data spaces being used, then the additional trees would be written as well using this process.

Step 918 will write the tuples being buffered corresponding to the current LHDS and subdivision of that space. In at least one embodiment, it may compress them in step 920 and then write them to the data block in step 922. The location and size of the data block that is written will be kept so that it can be an input when the subdivision's parent subdivision is written.

Figure 9B:
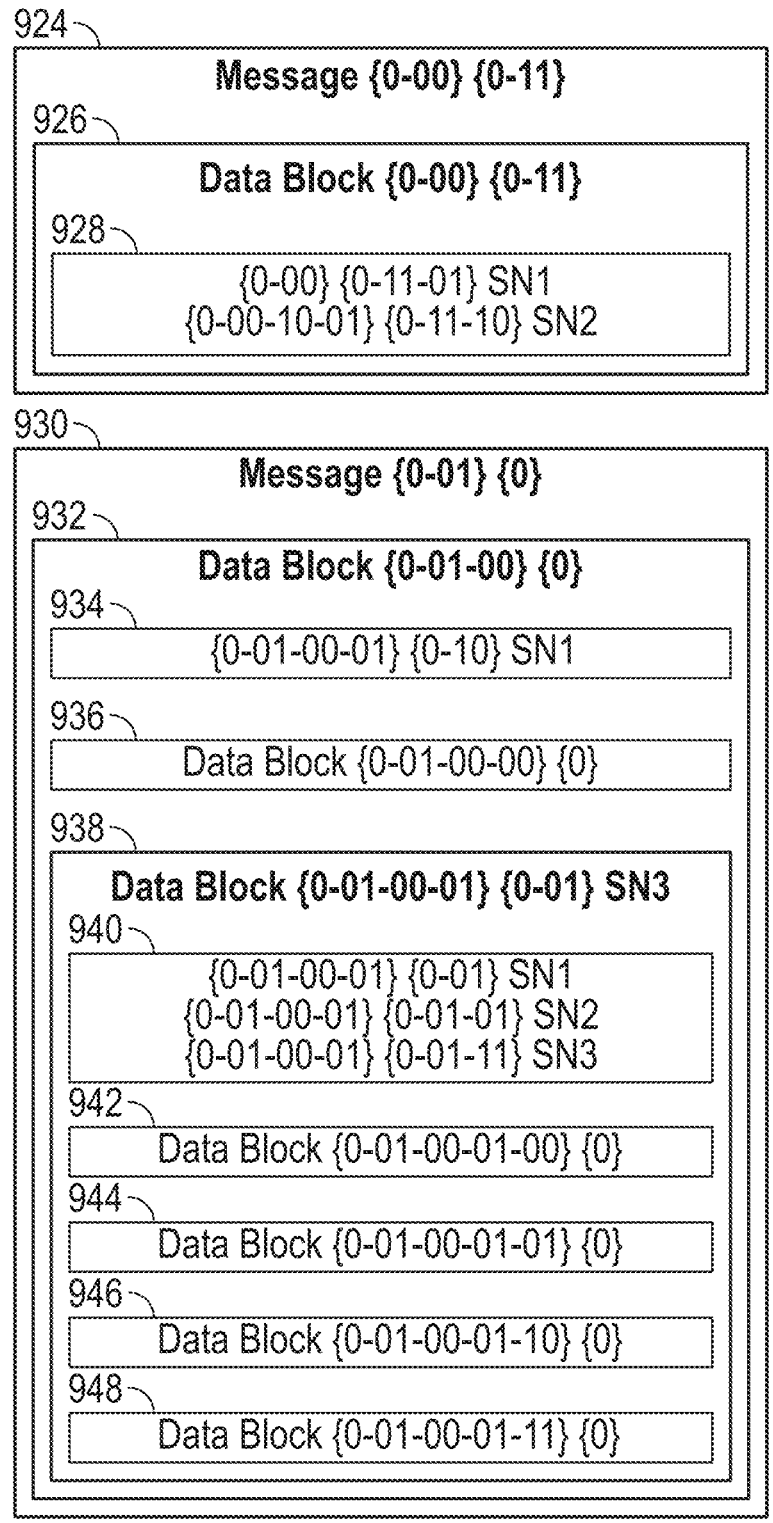
FIG. 9B shows information organized in data blocks in multiple messages wherein the messages and data blocks correspond to subdivisions of two different logical hierarchical data spaces according to various embodiments.

FIG. 9B shows messages corresponding to subdivisions of two logical hierarchical data spaces. Each message is comprised of data blocks corresponding to subdivisions of the two logical hierarchical data spaces. Message 924 corresponds to subdivision {0-00} of a first LHDS and subdivision {0-11} of a second logical hierarchical data space. Message 924 only contains data in those subdivisions or their child subdivisions. This provides an efficient way to determine if a message may contain data of interest to an operation without looking at the values in the message.

Message 924 contains a single data block 926. Data block 926 is associated with subdivision {0-00} of a first LHDS and subdivision {0-11} of a second logical hierarchical data space. Therefore, the common subdivisions of both logical hierarchical data spaces for message 924 is {0-00} {0-11}. Data block 926 contains data tuples 928. Each tuple has subdivisions of each logical hierarchical data spaces that are either the same or are child subdivisions for the subdivisions of data block 926.

Message 930 contains multiple data blocks that are organized hierarchically. Data block 932 contains data block 936 and data block 938. Data block 938 contains data block 942, data block 944, data block 946, and data block 948. This arrangement preserves the hierarchy of the first logical hierarchical data space.

Data block 932 contains a single tuple 934. Data block 938 contains data 940 consisting of 3 tuples, each with a sequence number for the subdivision of the first logical hierarchical data space. The 3 tuples are stored by subdivision of the second logical hierarchical data space.

Figure 9C:
FIG. 9C shows a system for transmitting messages comprised of data blocks corresponding to subdivisions of logical hierarchical data spaces between clients and servers according to various embodiments.

FIG. 9C shows a client/server system for transmitting messages with data organized using hierarchical data spaces. Client 950 creates a message 954 comprised of data blocks corresponding to subdivisions of logical hierarchical data spaces. Server 952 receives the message and can perform efficient probabilistic hierarchical data space operations prior to needing to deserialize the data and operate upon the values of the tuples in the message.

Referring now also to FIG. 10, at least a portion of the methodologies and techniques described with respect to the exemplary embodiments of the method and system 104/FIG. 2 can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system 104/FIG. 2. For example, the machine may be configured to, but is not limited to, assist the system 104/FIG. 2 by providing processing power to assist with processing loads experienced in the system 104/FIG. 2, by providing storage capacity for storing instructions or data traversing the system 104/FIG. 2, or by assisting with any other operations conducted by or within the system 104/FIG. 2 to, for example, implement one or more steps of the methods described herein.

In some embodiments, the machine may operate as a standalone device. In some embodiments, the machine may be connected (e.g., using communications network 1035, another network, or a combination thereof) to and assist with operations performed by other machines and systems. The machine may be connected with any component in the system 104/FIG. 2. In a networked deployment, the machine may operate in the capacity of a server or a client, such as a client user machine, in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010, which may be, but is not limited to, a liquid crystal display (LCD), a flat panel, a solid state display, or a cathode ray tube (CRT). The computer system 1000 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 1002, or a combination thereof, during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 1035, another network, or a combination thereof, can send or receive voice, video or data, and to communicate over the communications network 1035, another network, or a combination thereof, using the instructions. The instructions 1024 may further be transmitted or received over the communications network 1035, another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system for at least one of transmitting or storing information, the system comprising:
    a memory that stores instructions; and
    a processor that executes the instructions to perform operations, the operations comprising:
        creating at least one parent data block wherein the at least one parent data block comprises a plurality of child data blocks;
        determining at least one subdivision for a first logical hierarchical data space of a plurality of different logical hierarchical data spaces; wherein the first logical hierarchical data space includes a plurality of subdivisions;

determining at least one subdivision for at least one second logical hierarchical data space of the plurality of different logical hierarchical data spaces, wherein the at least one second logical hierarchical data space includes a plurality of subdivisions;

writing at least one tuple to at least one data block of the plurality of child data blocks, wherein the at least one tuple is associated with the at least one subdivision of the first logical hierarchical data space and the at least one tuple is associated with the at least one subdivision of the at least one second logical hierarchical data space;

storing at least one first association between the at least one data block of the plurality of child data blocks and the at least one subdivision of the first logical hierarchical data space of the plurality of different logical hierarchical data spaces in at least one data block metadata map; and storing at least one second association between the at least one data block and the at least one subdivision of the at least one second logical hierarchical data space of the plurality of different logical hierarchical data spaces in the at least one data block metadata map.

2. The system of claim 1, further comprising storing the location of the at least one data block in the at least one parent data block in the at least one data block metadata map.

3. The system of claim 1, further comprising storing the size of the at least one data block in the at least one data block metadata map.

4. The system of claim 1, further comprising storing the at least one data block metadata map in at least one file.

5. The system of claim 1, further comprising storing the at least one data block metadata map in at least one message.

6. The system of claim 1, further comprising storing the at least one data block metadata map in at least one parent data block of the at least one data block of the plurality of child data blocks.

7. The system of claim 1, further comprising storing the at least one data block metadata map in at least one registrar.

8. The system of claim 1, further comprising organizing the at least one data block metadata map using a physical hierarchical data space.

9. The system of claim 1, further comprising organizing the at least one data block metadata map using a list.

10. The system of claim 1, further comprising pruning the at least one data block metadata map to limit the size of the at least one data block metadata map.

11. The system of claim 1, further comprising storing statistics associated with the at least one data block in the at least one data block metadata map.

12. A method for at least one of transmitting or storing information, the method comprising:

creating, by utilizing instructions from a memory that are executed by a processor, at least one parent data block, wherein the at least one parent data block comprises a plurality of child data blocks;

determining at least one subdivision for a first logical hierarchical data space of a plurality of different logical hierarchical data spaces; wherein the first logical hierarchical data space includes a plurality of subdivisions;

determining at least one subdivision for at least one second logical hierarchical data space of the plurality of different logical hierarchical data spaces; wherein the at least one second logical hierarchical data space includes a plurality of subdivisions;

writing at least one tuple to at least one data block of the plurality of child data blocks, wherein the at least one tuple is associated with the at least one subdivision of the first logical hierarchical data space and the at least one tuple is associated with the at least one subdivision of the at least one second logical hierarchical data space;

storing at least one first association between the at least one data block of the plurality of child data blocks and the at least one subdivision of the first logical hierarchical data space of the plurality of different logical hierarchical data spaces in at least one data block metadata map; and storing at least one second association between the at least one data block and the at least one subdivision of the at least one second logical hierarchical data space of the plurality of different logical hierarchical data spaces in the at least one data block metadata map.

13. The method of claim 12, further comprising storing the location of the at least one data block in the at least one parent data block in the at least one data block metadata map.

14. The method of claim 12, further comprising storing the size of the at least one data block in the at least one data block metadata map.

15. The method of claim 12, further comprising storing the at least one data block metadata map in at least one file.

16. The method of claim 12, further comprising storing the at least one data block metadata map in at least one message.

17. The method of claim 12, further comprising storing the at least one data block metadata map in at least one parent data block of the at least one data block of the plurality of child data blocks.

18. The method of claim 12, further comprising storing the at least one data block metadata map in at least one registrar.

19. The method of claim 12, further comprising organizing the at least one data block metadata map using a physical hierarchical data space.

20. The method of claim 12, further comprising organizing the at least one data block metadata map as a list.

21. The method of claim 12, further comprising pruning the at least one data block metadata map to limit the size of the at least one data block metadata map.

22. The method of claim 12, further comprising storing statistics associated with the at least one data block in the at least one data block metadata map.

23. A non-transitory computer readable device including instructions, which when loaded and executed by a processor, causes the processor to perform operations for at least one of transmitting or storing information comprising:

creating at least one parent data block wherein the at least one parent data block comprises a plurality of child data blocks;

determining at least one subdivision for a first logical hierarchical data space of a plurality of different logical hierarchical data spaces; wherein the first logical hierarchical data space includes a plurality of subdivisions;

determining at least one subdivision for at least one second logical hierarchical data space of a plurality of different logical hierarchical data spaces, wherein the at least one second logical hierarchical data space includes a plurality of subdivisions;

writing at least one tuple to at least one data block of the plurality of child data blocks, wherein the at least one tuple is associated with the at least one subdivision of the first logical hierarchical data space and the at least one tuple is associated with the at least one subdivision of the at least one second logical hierarchical data space;

storing at least one first association between the at least one data block of the plurality of child data blocks and the at least one subdivision of the first logical hierarchical data space of the plurality of different logical hierarchical data spaces in at least one data block metadata map; and storing at least one second association between the at least one data block and the at least one subdivision of the at least one second logical hierarchical data space of the plurality of different logical hierarchical data spaces in the at least one data block metadata map.

24. The non-transitory computer readable device of claim 23, further comprising storing the location of the at least one data block in the at least one parent data block in the at least one data block metadata map.

25. The non-transitory computer readable device of claim 23, further comprising storing the size of the at least one data block in the at least one data block metadata map.

26. The non-transitory computer readable device of claim 23, further comprising storing the at least one data block metadata map in at least one file.

27. The non-transitory computer readable device of claim 23, further comprising storing the at least one data block metadata map in at least one message.

28. The non-transitory computer readable device of claim 23, further comprising storing the at least one data block metadata map in at least one parent data block of the at least one data block of the plurality of child data blocks.

29. The non-transitory computer readable device of claim 23, further comprising storing the at least one data block metadata map in at least one registrar.

30. The non-transitory computer readable device of claim 23, further organizing the at least one data block metadata map using a physical hierarchical data space.

31. The non-transitory computer readable device of claim 23, further organizing the at least one data block metadata map as a list.

32. The non-transitory computer readable device of claim 23, further comprising pruning the at least one data block metadata map to limit the size of the at least one data block metadata map.

33. The non-transitory computer readable device of claim 23, further comprising storing statistics associated with the at least one data block in the at least one data block metadata map.

* * * * *